(12) United States Patent
Dice

(10) Patent No.: US 6,735,760 B1
(45) Date of Patent: May 11, 2004

(54) RELAXED LOCK PROTOCOL

(75) Inventor: David Dice, Foxborough, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 578 days.

(21) Appl. No.: 09/708,576

(22) Filed: Nov. 8, 2000

(51) Int. Cl.$^7$ .............................. G06F 9/45; G06F 9/00

(52) U.S. Cl. ..................... 717/139; 717/140; 717/151; 718/102

(58) Field of Search ................................ 717/139, 140; 717/151; 718/102

(56) References Cited

U.S. PATENT DOCUMENTS

| | | | |
|---|---|---|---|
| 4,435,766 A | 3/1984 | Haber et al. | |
| 5,297,283 A | 3/1994 | Kelly, Jr. et al. | 395/650 |
| 5,701,470 A | 12/1997 | Joy et al. | 395/614 |
| 5,822,588 A | 10/1998 | Sterling et al. | 395/704 |
| 5,826,081 A | 10/1998 | Zolnowsky | 395/673 |
| 5,862,376 A | 1/1999 | Steele, Jr. et al. | 395/677 |
| 5,875,461 A | 2/1999 | Lindholm | 711/118 |
| 5,924,098 A | 7/1999 | Kluge | 707/100 |
| 6,026,401 A * | 2/2000 | Brealey et al. | 707/8 |
| 6,026,427 A | 2/2000 | Nishihara et al. | 709/106 |
| 6,134,627 A * | 10/2000 | Bak | 711/6 |
| 6,212,608 B1 * | 4/2001 | Bak | 711/152 |
| 6,237,043 B1 * | 5/2001 | Brown et al. | 709/316 |
| 6,247,025 B1 * | 6/2001 | Bacon | 707/206 |
| 6,314,563 B1 * | 11/2001 | Agesen et al. | 717/108 |
| 6,622,155 B1 * | 9/2003 | Haddon et al. | 709/100 |
| 2001/0014905 A1 * | 8/2001 | Onodera | 709/102 |

FOREIGN PATENT DOCUMENTS

| | | | |
|---|---|---|---|
| EP | 0 451 080 A2 | 10/1991 | |
| EP | 08067302 | 11/1997 | G06F/9/46 |
| JP | 11-85545 | 3/1999 | G06F/15/16 |
| WO | WO 98 33119 A1 | 7/1998 | |

OTHER PUBLICATIONS

Agesen, Detlefs, Garthwaite, Knippel, Ramakrishna, and White, "An Efficient Meta–lock for Implementing Ubiquitous Synchronization", Nov. 5, 1999, OOPSLA '99 Proceedings, ACM, pp 207–222.*
David Dice, "Implementing Fast Java Monitors with Relaxed–Locks", Apr. 24, 2001, USENIX Association, Proceedings of the Java Virtual Machine Research and Technology Symposium (JVM '01).*
Etienne Gagnon, "A Portable Research Framework for the Execution of Java Bytecode", Dec. 2002, McGill University, Ph.D. Thesis, Chapter 7.*
"Java 2 SDK Production Release", Sun Microsystems Inc., Online [Archived Oct. 12, 1999, Accessed Dec. 30, 2003], <http://web.archive.org/web/19991012153541/http://sun-.com/solaris/java/more12.htm> one page.*

(List continued on next page.)

*Primary Examiner*—Tuan Dam
*Assistant Examiner*—James D Rutten
(74) *Attorney, Agent, or Firm*—Foley Hoag LLP

(57) ABSTRACT

An object-oriented compiler/interpreter allocates monitor records for use in implementing synchronized operations on objects. When a synchronization operation is to be performed on an object, a thread that is to perform the operation "inflates" the object's monitor by placing into its header a pointer to the monitor record as well as an indication of the monitor's inflated status. When a thread is to release its lock on an object, it first consults a reference-count field in the monitor record to determine whether any other threads are synchronized on the object. It then dissociates the object from the monitor record. The dissociation is not atomic with the reference-count check, so the releasing thread checks the reference count again. If that count indicates that further objects had employed the monitor record to synchronize on the object in the interim, then the unlocking thread wakes all waiting threads.

45 Claims, 20 Drawing Sheets

OTHER PUBLICATIONS

David F. Bacon et al., *Thin Locks: Featherweight Synchronization for Java* IBM T.J. Watson Research Center.

Andrew D. Birrell, *An Introduction to Programming with Threads,* System Research Center, Jan. 6, 1989. pp. 1–33.

Peter Magnusson et al., *Efficient Software Synchronization on Large Cache Coherent Multiprocessors,* Swedish Institute of Computer Science, Feb. 18, 1994. pp. 1–32.

Cliff Berg, *How Do Threads Work and How Can I Create a General–Purpose Event?*, Dr. Dobb's Journal, vol. 23, Nov. 1996.

Mike Criscolo, *How Do I Queue Java Threads?*, Dobb's Journal, vol. 23, Oct. 1998.

Dan Ford, *Mutual Exclusion and Synchronization in Java: Mimicking Win32 Synchronization Mechanisms,* Dr. Dobb's Journal, vol. 23, Jan. 1998.

Richard J. Anderson et al., *Wait–free Parallel Algorithms for the Union–Find Problem,* Annual ACM Symposium on Theory of Computing, pp. 370–380.

Thomas E. Anderson, *The Performance of Spin Lock Alternatives for Shared–Memory Multiprocessors,* IEEE, 1990, pp. 6–16.

Peter A. Buhr et al., *Monitor Classification,* ACM Computer Surveys, Mar. 1995, pp. 1–40.

Sylvia Dieckmann et al., *A Study of the Allocation Behavior of the SPECjvm98 Java Benchmarks,* University of Santa Barbara, Department of Computer Science, Dec. 3, 1998, pp. 1–21.

Brinch Hansen, *Monitors and Concurrent Pascal Session,* Syracuse University, School of Computer and Information Science, pp. 121–155.

C.A.R. Hoare, *Monitors: An Operating System Structuring Concept,* The Queen's University of Belfast, ACM, Feb. 1996.

Andreas Krall, *Efficient JavaVM Just–in–Time Compilation,* IEEE 1998, pp. 1–8.

Leslie Lamport, *A Fast Mutual Exclusion Algorithm,* Systems Research Center, Nov. 14, 1985, pp 1–12.

John M. Mellor–Crummey et al., *Algorithms for Scalable Synchronization on Shared–Memory Multiprocessors,* ACM Transactions on Computer Systems, vol. 9, Feb. 1991, pp. 21–65.

Gilles Muller et al., *Harissa: A Flexible and Efficient Java Environment Mixing Bytecode and Compiled Code,* IRISA/INRIA–University of Rennes.

John Neffenger, *Which Java VM Scales Best?*, Java World, Aug. 1998.

Todd A. Proebsting et al., *Toba: Java for Applications, A Way Ahead of Time (WAT) Compiler,* University of Arizona, pp. 1–14.

Tabatabai et al., *Fast, Effective Code Generation in a Just–In–Time Java Compiler,* Intel Corporation, pp. 280–290.

Tamiya Onodera, *A Simple and Space–Efficient Monitor Optimization for Java,* IBM Research, Tokyo Research Laboratory, Jul. 17, 1998, pp 1–7.

Tamiya Onodera et al., *A Study of Locking Objects with Bimodal Fields,* IBM Research, Tokyo Research Laboratory, Sep. 25, 1998, pp. 1–15.

*Threads and Locks,* Java Language Specification, First Edition, Chapter 17.

Michael Greenwald et al. *The Synergy Between Non–Blocking Synchronization and Operating System Structure,* Computer Science Department of Stanford University.

Andreas Krall et al., *Monitors and Exceptions: How to Implement Java Efficiently.*

Threads Library, mutex (3T), SunOS 5.6, May 8, 1997, pp. 1–2.

E.W Dijkstra, *Solution of a Problem in Concurrent Programming Control,* Technological University, Eindhoven, The Netherlands, p. 569.

\* cited by examiner

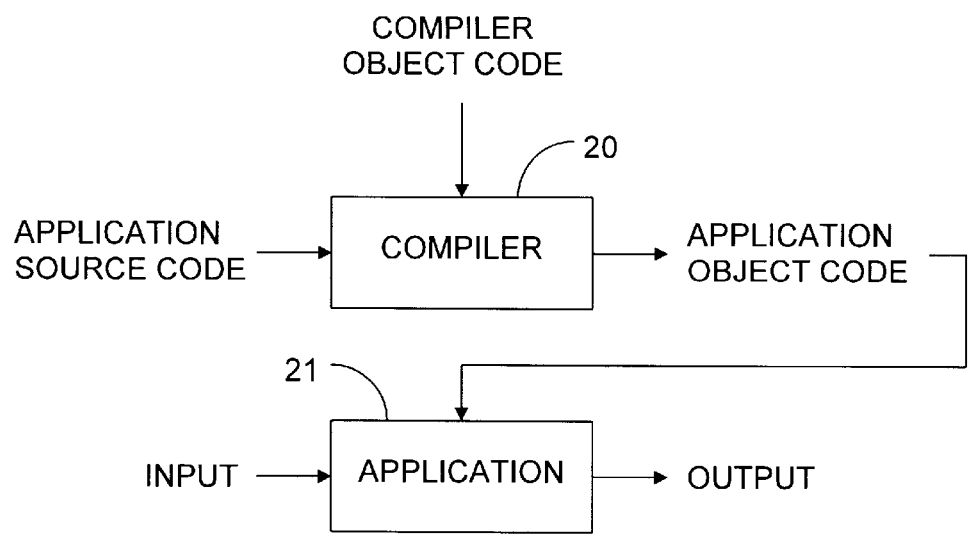

FIG. 2

```
class Bar {
        doSomething() { . . .}
        void onlyMe(Foo f) {
                synchronized(f) {doSomething();}
        }
}
```

FIG. 5

| | | |
|---|---|---|
| 1 | aload_1 | // Load f onto operand stack |
| 2 | astore_2 | // Store it in local variable 2 |
| 3 | aload_2 | // Load local variable 2 (f) onto stack |
| 4 | monitorenter | // Enter the monitor associated with f |
| 5 | aload_0 | // Holding the monitor, pass this and |
| 6 | invokevirtual #5 | // call doSomething() |
| 7 | aload_2 | // Load local variable 2 (f) onto stack |
| 8 | monitorexit | // Exit the monitor associated with f |
| 9 | return | // Return normally |
| 10 | aload_2 | // In case of any throw, end up here |
| 11 | monitorexit | // Be sure to exit monitor, |
| 12 | athrow | // then rethrow the value to the invoker |

Exception table:

| From | To | Target | Type |
|---|---|---|---|
| 4 | 8 | 11 | any |

FIG. 6

```
1    public Class TwoThreads {
2        public static void main (String args[]) {
3            Bank b = new Bank();
4            Transferor transferor = new Transferor(b);
5            Totaler totaler = new Totaler(b);
6            transferor.start();
7            totaler.start();
8        }
9    }

10   class Bank {
11       float account_1 = 30,
12       float account_2 = 30;
13       public synchronized void transfer(float amount) {
14           account_1 -= amount;
15           account_2 += amount;
16       }
17       public synchronized float total() {return account_1 + account_2;}
18   }

19   public class Transferor extends Thread {
20       Bank b;
21       public Transferor(Bank b) { this.b = b; }
22       void run(){
23           int sign = 1;
24           for (int i = 0; i < 5; i++) {
25               sign = -1 * sign;
26               b.transfer(15.00 * sign);}
27       }
28   }

29   public class Totaler extends Thread {
30       Bank b;
31       public Totaler(Bank b) { this.b = b; }
32       void run(){
33           for (int i = 0; i < 5; i++) { System.out.println(b.total()); }
34       }
35   }
```

FIG. 4

```
1   int monEnter (ExecEnv * ee, Object * obj)
2   {  monRec * m ;
3      monRec * nxt ;
4      int err;
5      intptr_t raw ;
6   retry:
7      raw = obj->LockWord ;
8      if (!INFLATED(raw)) {          // Case 1: Vacant – fast path
9         m = ee->MonFree ;
10        if (m == NULL)
11           m = ExtendFreeList (ee) ;
12        m ->hashCode = raw ;
13        if (!HASHED(raw)) {
14           m->hashCode = gcHash ^ INT(obj) ;
15        }
16        nxt = m->MonNext ;
17        if (CAS(&obj->LockWord, raw, MKMON(m)) == raw) {
18           ee->MonFree = nxt ;   // successfully installing "m" confers ownership
19           return OK;
20        }
21        goto retry ;           // CAS failed: interference -- retry
22     }
23
24     m = MONREC(raw) ;
25     if (m->Owner == ee) {         // Case 2: Inflated and locked by calling thread
26        m->Nest ++ ;
27        return OK ;
28     }
29     // Case 3: inflated and unlocked. optimization – not strictly necessary.
30     if (m->Owner == NULL && CAS(&m->Owner, NULL, ee) == NULL) {
31        if (obj->LockWord == raw) {
32           m->Nest = 1 ;
33           return OK ;
34        }
35        m->Owner = NULL ;     // "m" is stale wrt obj. Recover as needed
36        MEMBAR(StoreLoad) ;
37        monWakeup (ee, m) ;
38        goto retry ;
39     }
```

Fig. 8A

```
40    // Case 4: inflated and locked by another thread.
41    // Slow path ... apparent contention: do this the hard way
42    Adjust (&m->rcThis, 1) ;        // atomic fetch-and-add
43    if (obj->LockWord != raw) {
44        Adjust (&m->rcThis, -1) ;   // "m" is stale wrt obj
45        MarkSuspect (ee, m) ;
46        goto retry ;
47    }
48    while (obj->LockWord == raw) {
49        m->Candidate = 1 ;
50        MEMBAR(StoreLoad) ;
51        if (m->Owner == NULL && CAS(&m->Owner, NULL, ee) == NULL) {
52            Adjust (&m->rcThis, -1) ;
53            m->Nest = 1 ;
54            return OK ;
55        }
56        err = _lwp_sema_wait (&m->EntryQ) ;
57        // We're awake – recontend for the object
58    }
59    FlushAcknowledge (ee, m) ;   // we've been flushed
60    goto retry ;
61 }
```

Fig. 8B

```
1   int monExit (ExecEnv * ee, Object * obj)
2   {
3       monRec * m ;
4       intptr_t raw ;
5       int nn ;
6       raw = obj->LockWord ;
7       m = MONREC(raw) ;
8       if (INFLATED(raw) && m->Owner == ee) {
9           nn = m->Nest - 1 ;
10          if (nn == 0) {
11              if (m->rcThis == 0) {
12                  obj->LockWord = m->hashCode ;   // attempt speculative deflate
13                  MEMBAR(StoreLoad) ;
14                  m->hashReader = NULL ;
15                  if (m->rcThis == 0) {
16                      ReturnToFreeList (ee, m) ;   // recycle m
17                      return OK ;                  // fast path exit
18                  } else {
19                      FlushAndFree (ee, m) ;      // misspeculated - expel blocked threads
20                      return OK ;
21                  }
22              } else {
23                  m->objRoot = obj ;              // assist Suspect recovery
24                  m->Owner = NULL ;
25                  MEMBAR(StoreLoad) ;
26                  monWakeup (ee, m) ;
27                  return OK ;
28              }
29          }
30          // The following memory barrier is unrelated to the Relaxed-Lock protocol.
31          // The Java Memory Model promises release consistency.
32          MEMBAR(StoreLoad);
33          m->Nest = nn ;
34          return OK ;
35      }
36      return THROW(ILLEGAL_MONITOR_STATE) ;
37  }
38
39  void monWakeup (ExecEnv * ee, monRec * m)
40  {
41      if (m->Candidate == 1 && CAS(&m->Candidate, 1, 0) == 1) {
42          _lwp_sema_post (&m->EntryQ) ;
43      }
44  }
```

Fig. 9

| Time | Thread | Action |
|---|---|---|
| 1 | T2 | monEnter(O). Inflate O with monitor record m. Sets O's LockWord to m |
| 2 | T1 | monEnter(O). Observe that O's LockWord points to m. |
| 3 | T2 | monExit(O).  recycle m, deflate O.  [Fig. 9 Lines 12 and 16]. |
| 4 | T2 | monEnter(P). Inflate P with monitor record m. Set P's LockWord to m. |
| 5 | T1 | monEnter(O) ... continued.  Increment m's rcThis. MonEnter has adjusted the rcThis field on a stale monitor-record pointer.  [Fig. 8, Line 42]. |
| 6 | T2 | monExit(P).  Observe that m's rcThis value is non-zero. Skip deflation. [Fig. 9, Line 11-23] |
| 7 | T1 | monEnter(O) .... Continued.  We observe that O's LockWord doesn't point to m: m is stale. Decrement m's rcThis to compensate for the improper increment. Unfortunately our untimely increment of rcThis at time 5 prevented object P from deflating. m is now an orphan. P's LockWord value is m, but m's Owner field is NULL and its rcThis field contains 0.  We risk leaking m. [Fig. 8, Lines 42–46] |

Fig. 10

| Time | Thread | Action |
|---|---|---|
| 1 | T1 | Lock (O): T1 wins O. |
| 2 | T2 | Lock (O): T2 blocks on O. The EntryQ for O is now <T2> |
| 3 | T3 | Lock (O): T3 blocks on O. The EntryQ for O is now <T2,T3> |
| 4 | T4 | Lock (O): T4 blocks on O. The EntryQ for O is now <T2,T3,T4> |
| 5 | T1 | Unlock (O): T1 releases O and picks T2 as the heir apparent. T2 moves from the EntryQ to the system's Ready Queue (sometimes called the Run Queue). T1 keeps running. |
| 6 | T1 | Lock (O): T1 wins O. |
| 7 | T1 | Unlock (O): T1 releases O and picks T3 as the heir apparent. T3 moves from the EntryQ to the Ready Queue. T1 keeps running. |
| 8 | T1 | Lock (O): T1 wins O. |
| 9 | T1 | Unlock (O): T1 releases O and picks T4 as the heir apparent. T4 moves from the EntryQ to the Ready Queue. T1 keeps running. |
| 10 | T1 | Lock (O): T1 wins O. |
| 11 | T1 | The kernel preempts T1, putting it at the tail of the Ready Queue. The kernel examines the Ready Queue finding <T2,T3,T4,T1>. The kernel picks T2 and makes T2 ready. |
| 12 | T2 | T2 resumes and attempts to acquire the lock. T2 fails because T1 holds the lock. T2 reblocks on O and moves to the EntryQ. |
| 13 | -- | The kernel examines the Ready Queue and picks T3 to run next. |
| 14 | T3 | T3 resumes and attempts to acquire the lock. T3 fails as T1 owns the lock. T3 reblocks on O and moves to the EntryQ. |
| 15 | -- | The kernel examines the Ready Queue and picks T4 to run next. |
| 16 | T4 | T4 resumes and attempts to acquire the lock. T4 fails as T1 owns the lock. T4 reblocks on O and moves to the EntryQ. |
| 17 | T1 | The kernel picks T1 to run next. T1 resumes executing. It still holds the lock. |

Fig. 11

```
1   int monHash (ExecEnv * ee, Object * obj)
2   {
3      monRec * m ;
4      intptr_t raw, hc ;
5   retry:
6      raw = obj->LockWord ;
7      if (!INFLATED(raw) && !HASHED(raw)) {   // case: unhashed
8         hc = gcHash ^ (intptr_t)(obj) ;   // create and assign hashCode
9         if (CAS (&obj->LockWord, raw, hc ) != raw) {
10           goto retry ;
11        }
12        return GETHASH(hc) ;
13     }
14
15     if (!INFLATED(raw) && HASHED(raw)) {   // case: hashed, uninflated
16        return GETHASH(raw) ;            // simply return value
17     }
18
19     // Lock object to avoid deflation.  Inflated implies hashed.
20     if (monTryLock (ee, obj) == 0) {      // try locking the object
21        hc = MONREC(obj->LockWord)->hashCode ;
22        monExit (ee, obj) ;
23        return GETHASH(hc) ;
24     }
25
26     // Do it the hard way.  Resample until we get the correct value.
27     m = MONREC(raw) ;
28     m->hashReader = ee ;                  // avoid ABA read hazard
29     MEMBAR(StoreLoad) ;
30     hc = m->hashCode ;
31     if (obj->LockWord != raw || m->hashReader != ee) {
32        goto retry ;                       // Stale value or interference
33     }
34     return GETHASH(hc) ;
35  }
```

Fig. 12

RELAXED LOCK PROTOCOL

BACKGROUND OF THE INVENTION

1. Field of the Invention

The present invention is directed to compiling and interpreting computer programs. It particularly concerns synchronization between execution threads.

2. Background Information

FIG. 1 depicts a typical computer system 10. A microprocessor 11 receives data, and instructions for operating on them, from on-board cache memory or further cache memory 12, possibly through the mediation of a cache controller 13, which can in turn receive such data from system read/write memory ("RAM") 14 through a RAM controller 15, or from various peripheral devices through a system bus 16.

The RAM 14's data and instruction contents will ordinarily have been loaded from peripheral devices such as a system disk 17. Other sources include communications interface 18, which can receive instructions and data from other computer systems.

The instructions that the microprocessor executes are machine instructions. Those instructions are ultimately determined by a programmer, but it is a rare programmer who is familiar with the specific machine instructions in which his efforts eventually result. More typically, the programmer writes higher-level-language "source code" from which a computer software-configured to do so generates those machine instructions, or "object code."

FIG. 2 represents this sequence. FIG. 2's block 20 represents a compiler process that a computer performs under the direction of compiler object code. That object code is typically stored on the system disk 17 or some other machine-readable medium, and it is loaded by transmission of electrical signals into RAM 15 to configure the computer system to act as a compiler. But the compiler object code's persistent storage may instead be provided in a server system remote from the machine that performs the compiling. The electrical signals that carry the digital data by which the computer systems exchange the code are exemplary forms of carrier waves transporting the information.

The compiler converts source code into further object code, which it places in machine-readable storage such as RAM 15 or disk 17. A computer will follow that object code's instructions in performing an application 21 that typically generates output from input. The compiler 20 is itself an application, one in which the input is source code and the output is object code, but the computer that executes the application 21 is not necessarily the same as the one that executes the compiler application.

The source code need not have been written by a human programmer directly. Integrated development environments often automate the source-code-writing process to the extent that for many applications very little of the source code is produced "manually." As will be explained below, moreover, the "source" code being compiled may sometimes be low-level code, such as the byte-code input to the Java™ virtual machine, that programmers almost never write directly. (Sun, the Sun Logo, Sun Microsystems, and Java are trademarks or registered trademarks of Sun Microsystems, Inc., in the United States and other countries.) And, although FIG. 2 may appear to suggest a batch process, in which all of an application's object code is produced before any of it is executed, the same processor may both compile and execute the code, in which case the processor may execute its compiler application concurrently with—and, indeed, in a way that can be dependent upon—its execution of the compiler's output object code.

So the sequence of operations by which source code results in machine-language instructions may be considerably more complicated than one may infer from FIG. 2. To give a sense of the complexity that can be involved, we discuss by reference to FIG. 3 an example of one way in which various levels of source code can result in the machine instructions that the processor executes. The human application programmer produces source code 22 written in a high-level language such as the Java programming language. In the case of the Java programming language, a compiler 23 converts that code into "class files." These predominantly include routines written in instructions, called "byte codes" 24, for a "virtual machine" that various processors can be programmed to emulate. This conversion into byte codes is almost always separated in time from those codes' execution, so that aspect of the sequence is depicted as occurring in a "compile-time environment" 25 separate from a "run-time environment" 26, in which execution occurs.

Most typically, the class files are run by a processor under control of a computer program known as a virtual machine 27, whose purpose is to emulate a machine from whose instruction set the byte codes are drawn. Much of the virtual machine's action in executing these codes is most like what those skilled in the art refer to as "interpreting," and FIG. 3 shows that the virtual machine includes an "interpreter" 28 for that purpose. The resultant instructions typically involve calls to a run-time system 29, which handles matters such as loading new class files as they are needed and performing "garbage collection," i.e., returning allocated memory to the system when it is no longer needed.

Many virtual-machine implementations also actually compile the byte codes concurrently with the resultant object code's execution, so FIG. 3 depicts the virtual machine as additionally including a "just-in-time" compiler 30. It may be that the resultant object code will make low-level calls to the run-time system, as the drawing indicates. In any event, the code's execution will include calls to the local operating system 31.

It is not uncommon for a virtual-machine implementation both to compile and to interpret different parts of the same byte-code program. And, although the illustrated approach of first compiling the high-level code into byte codes is typical, the Java programming language is sometimes compiled directly into native machine code. So there is a wide range of mechanisms by which source code—whether high-level code or byte code—can result in the actual native machine instructions that the hardware processor executes. The teachings to be set forth below can be used in all of them, many of which, as was just explained, do not fit neatly into either the compiler or interpreter category. So we will adopt the term compiler/interpreter to refer to all such mechanisms, whether they be compilers, interpreters, hybrids thereof, or combinations of any or all of these.

In actual operation, the typical computer program does not have exclusive control over the machine whose operation it directs; a typical user concurrently runs a number of application programs. Of course, a computer that is not a multiprocessor machine can at any given instant be performing the instructions of only one program, but a typical multitasking approach employed by single-processor machines is for each concurrently running program to be interrupted from time to time to allow other programs to run, with the rate of such interruption being high enough that the programs' executions appear simultaneous to the human user.

The task of scheduling different applications programs' executions typically falls to the computer's operating system. In this context, the different concurrently running programs are commonly referred to as different "processes." In addition to scheduling, the operating system so operates the computer that the various processes' physical code, data, and stack spaces do not overlap. So one process cannot ordinarily interfere with another. The only exceptions to this rule occur when a process specifically calls an operating-system routine ("makes a system call") intended for inter-process communication.

The operating system's scheduling function can be used to divide processor time not only among independent processes but also among a single process's different "threads of execution." Different execution threads are like different processes in that the operating system divides time among them so that they take can turns executing. They therefore have different call stacks, and the operating system has to swap out register contents when it switches between threads. But a given process's different execution threads share the same data space, so they can have access to the same data without operating-system assistance. Indeed, they also share the same code space and can therefore execute the same instructions, although different threads are not in general at the same point in those instructions' execution at the same time. By using threads to take advantage of the operating system's scheduling function, the programmer can simplify the task of programming a plurality of concurrent operations; he does not have to write the code that explicitly schedules the threads' concurrent executions.

FIG. 4 is a Java programming language listing of a way in which a programmer may code concurrent threads. The steps in that drawing's fourth and fifth lines create new instances of the classes Transferor and Totaler and assign these objects to variables transferor and totaler, respectively. The Transferor and Totaler classes can be used to create new threads of control, because they extend the class Thread, as the nineteenth and twenty-ninth lines indicate. When a Thread object's start( ) method is called, its run( ) method is executed in a new thread of control. So the sixth line's transferor.start( ) statement results in execution of the method, defined in the twenty-second through twenty-seventh lines, that transfers an amount back and forth between two member variables, account_1 and account_2, of an object of the class Bank. And the seventh line's totaler.start( ) statement results in execution of a method, defined in the thirty-second through thirty-fourth lines, that prints out the total of those member variables' values. Note that neither method refers to the other; by taking advantage of the programming language's thread facility, the programmer is relieved of the burden of scheduling.

There is not in general any defined timing between two concurrently running threads, and this is often the intended result: the various threads are intended to execute essentially independently of each other. But there are also many instances in which total independence would yield unintended results. For example, the b.transfer( ) method is intended to simulate internal transfers back and forth between two of a bank's accounts, while the b.total( ) method is intended to print out the total of the bank's account balances. Clearly, completely internal transfers should not change the bank's account total. But consider what would happen if the transferor thread's execution is interrupted between the fourteenth and fifteenth lines, i.e., between the time the amount is subtracted from one account and the time it is added to the other account. Intervening execution of the totaler thread could print the bank's total out as a value different from the one that the simulation is intended to represent: the state of the simulated bank would be inconsistent.

To prevent such inconsistent results, mechanisms for inter-thread communication have been developed. In the example, the thirteenth and seventeenth lines include the "synchronized" modifier. This directs the compiler/interpreter to synchronize its implementation of the transfer( ) and total( ) methods: before a thread begins execution of either method, it must obtain an exclusive "lock" on the object on which the instance method is called. That means that no other thread can execute a synchronized method on that object until the first thread releases its lock. If a transferor thread is in the midst of executing b.transfer( ), for instance, it must have a lock on object b, and this means that the totaler thread will be blocked from executing b.total( ) until the transferor thread's execution of transfer( ) has been completed.

Those familiar with the Java programming language will additionally recognize that a thread can lock an object even when it is not executing one of that object's synchronized methods. FIG. 5 is a listing of source code for a class Bar containing two methods. The "synchronized" statement in the onlyMe( ) method indicates that an execution thread must obtain a lock on the object f before it executes the subsequent code block, which calls the dosomething( ) method. FIG. 6 shows a possible result of compiling the onlyMe( ) method into Java-virtual-machine byte-code instructions. The fourth and eighth lines contain the mnemonics for the byte codes that direct the executing virtual machine respectively to acquire and release a lock on object f, which the topmost evaluation-stack entry references.

The particular way in which the compiler/interpreter obtains a lock on an object (also referred to as acquiring a "monitor" associated with the object) depends on the particular compiler/interpreter implementation. (It is important at this point to recall that we are using the term compiler/interpreter in a broad sense to include, for instance, the functions performed by a Java virtual machine in executing the so-called byte code into which the Java programming language code is usually compiled; it is that process that implements monitor acquisition in response to the byte code whose mnemonic is monitorenter. Still, Java programming language code also is occasionally compiled directly into native machine code without the intervening step of byte-code generation. Indeed, monitor acquisition and release in the case of FIG. 4's program would be performed without any explicit byte-code instruction for it, such as monitorexit, even if, as is normally the case, most of that code is compiled into byte code.)

The most natural way to implement a monitor is to employ available operating-system facilities for inter-thread and -process communication. Different operating systems provide different facilities for this purpose, but most of their applications-programming interfaces ("APIs") provide routines for operating on system data structures called "mutexes" (for "mutual exclusion"). A thread or process makes a system call by which it attempts to acquire a particular mutex that it and other threads and/or processes associate with a particular resource. The nature of mutex operations is such that an attempt to acquire a mutex is delayed (or "blocked") if some other process or thread currently owns that particular mutex; when a mutex-acquisition attempt completes, the process or thread that performed the acquisition may safely assume that no other process or thread will complete an acquisition operation until the current process or thread releases ownership of the mutex. If all processes or threads that access a shared resource follow a convention of considering a particular shared mutex to "protect" the resource—i.e., if every process or thread accesses the resource only when it owns the mutex—then they will avoid accessing the resource concurrently.

The system-mutex approach has been employed for some time and has proven effective in a wide variety of applications. But it must be used judiciously if significant performance penalties or programming difficulties are to be avoided. Since the number of objects extant at a given time during a program's execution can be impressively large, for instance, allocating a mutex to each object to keep track of its lock state would result in a significant run-time memory cost.

So workers in the field have attempted to minimize any such disincentives by adopting various monitor-implementation approaches that avoid storage penalties to as great an extent as possible. One approach is to avoid allocating any monitor space to an object until such time as a method or block synchronized on it is actually executed. When a thread needs to acquire a lock on an object under this approach, it employs a hash value for that object to look it up in a table containing pointers to monitor structures. If the object is already locked or currently has some other need for a monitor structure, the thread will find that monitor structure by consulting the table and performing the locking operation in accordance with that monitor structure's contents. Otherwise, the thread allocates a monitor structure and lists it in the table. When synchronization activity on the object ends, the monitor structure's space is returned to the system or a pool of monitor structures that can be used for other objects.

Since this approach allocates monitor structures only to objects that currently are the subject of synchronization operations, the storage penalty is minimal; although there are potentially very many extant objects at any given time, the number of objects that a given thread holds locked at one time is ordinarily minuscule in comparison, as is the number of concurrent threads. Unfortunately, although this approach essentially eliminates the excessive storage cost that making objects lockable could otherwise exact, it imposes a significant performance cost. Specifically, the time cost of the table lookup can be significant. It also presents scalability problems, since there can be contention for access to the table itself; the table itself must therefore be locked and thus can cause a bottleneck if the number of threads becomes large.

And the nature of object-oriented programming tends to result in extension of this performance cost to single-thread programming. There are classes of programming objects that are needed time and again in a wide variety of programming projects, and legions of programmers have duplicated effort in providing the same or only minimally different routines. One of the great attractions of object-oriented programming is that it lends itself to the development of class libraries. Rather than duplicate effort, a programmer can employ classes selected from a library of classes that are widely applicable and thoroughly tested.

But truly versatile class libraries need to be so written that each class is "thread safe." That is, any of that class's methods that could otherwise yield inconsistent results when methods of an object of that class are run in different threads will have to be synchronized. And unless the library provides separate classes for single-thread use, the performance penalty that synchronized methods exact will be visited not only upon multiple-thread programs but upon single-thread programs as well.

An approach that to a great extent avoids these problems is proposed by Bacon et al., "Thin Locks: Feather Weight Synchronization for Java," *Proc. ACM SIGPLAN '98*, Conference on Programming Language Design and Implementation (PLDI), pp. 258–68, Montreal, June 1998. That approach is based on the recognition that most synchronization operations are locking or unlocking operations, and most such operations are uncontended, i.e., involve locks on objects that are not currently locked or are locked only by the same thread. (In the Java virtual machine, a given thread may obtain multiple simultaneous locks on the same object, and a count of those locks is ordinarily kept in order to determine when the thread no longer needs exclusive access to the object.) Given that these are the majority of the situations of which the monitor structure will be required to keep track, the Bacon et al. approach is to include in the object's header a monitor structure that is only large enough (twenty-four bits) to support uncontended locking. That monitor includes a thread identifier, a lock count, and a "monitor shape bit," which indicates whether that field does indeed contain all of the monitor information currently required.

When a thread attempts to obtain a lock under the Bacon et al. approach, it first inspects the object's header to determine whether the monitor-shape bit, lock count, and thread identifier are all zero and thereby indicate that the object is unlocked and subject to no other synchronization operation. If they are, as is usually the case, the thread places an index identifying itself in the thread-identifier field, and any other thread similarly inspecting that header will see that the object is already locked. It happens that in most systems this header inspection and conditional storage can be performed by a single atomic "compare-and-swap" operation, so obtaining a lock on the object consists only of a single atomic operation if no lock already exists. If the monitor-shape bit is zero and the thread identifier is not zero but identifies the same thread as the one attempting to obtain the lock, then the thread simply retains the lock but performs the additional step of incrementing the lock count. Again, the lock-acquisition operation is quite simple. These two situations constitute the majority of locking operations.

But the small, twenty-four-bit header monitor structure does not have enough room for information concerning contended locking; there is no way to list the waiting threads so that they can be notified that the first thread has released the lock by writing zeroes into that header field. In the case of a contended lock, this forces the Bacon et al. arrangement to resort to "spin locking," also known as "busy-waits." Specifically, a thread that attempts to lock an object on which some other thread already has a lock repeatedly performs the compare-and-swap operation on the object-header monitor structure until it finds that the previous lock has been released. This is obviously a prodigal use of processor cycles, but it is necessary so long as the monitor structure does not have enough space to keep track of waiting threads.

When the previously "spinning" thread finally does obtain access to the object, the Bacon et al. arrangement deals with the busy-wait problem by having that thread allocate a larger monitor structure to the object, placing an index to the larger structure in the header, and setting the object's monitor-shape bit to indicate that it has done so, i.e., to indicate that the monitor information now resides outside the header. Although this does nothing to make up for the thread's previous spinning, it is based on the assumption that the object is one for which further lock contention is likely, so the storage penalty is justified by the future spinning avoidance that the larger structure can afford.

A review of the Bacon et al. approach reveals that its performance is beneficial for the majority of synchronization operations, i.e., for uncontested or nested locks. But it still presents certain difficulties. In the first place, although the object-header-resident monitor structure is indeed relatively small in comparison with a fuller-featured monitors, it still consumes twenty-four bits in each and every object. Since this is three bytes out of an average object size of, say, forty bytes, that space cost is non-negligible. Additionally, the relatively small monitor size forces a compromise between monitor size and contention performance. As was mentioned above, initial contention results in the significant performance penalty that busy-waits represent. The Bacon et al. arrangement avoids such busy-waits for a given object after the first contention, but only at the expense of using the larger monitor structure, which needs to remain allocated to that object unless the previously contended-for object is again to be made vulnerable to busy-waits. In other words, the Bacon et al. arrangement keeps the object's monitor structure "inflated" because the object's vulnerability to busy-waits would return if the monitor were "deflated."

Finally, the only types of synchronization operations with which the Bacon et al. approach can deal are the lock and unlock operations. It provides no facilities for managing other synchronization operations, such as those known as "wait," "notify," and "notifyAll"; it assumes the existence of heavy-weight monitor structures for those purposes.

An approach that addresses some of these shortcomings is the one described in commonly assigned U.S. patent application Ser. No. 09/245,778, which was filed on Feb. 5, 1999, by Agesen et al. for Busy-Wait-Free Synchronization and is hereby incorporated by reference. Compiler/interpreters that employ that approach allocate object structures in which the header includes a synchronization field, which can be as small as two bits, that can contain a code representing the object's synchronization state. The codes may indicate, for instance, whether the object (1) is locked, (2) has threads waiting to lock it or be "notified on" it, or (3) has no locks or waiters.

Since such a small field is not alone enough to contain all of the information concerning the object's synchronization when various threads are synchronized on the object, synchronization operations employing the Agesen et al. approach will involve access to monitor structures temporarily assigned to the object to support those operations. A thread precedes access to such structures with an attempt to acquire what that application calls "meta-lock" on the object, i.e., a lock on the monitor structures that contain the necessary synchronization information for that object. To acquire the meta-lock, the thread performs an atomic-swap operation, in which it atomically reads certain object-header fields' contents and replaces them with values that identify the thread and the metalocked state. If the prior value did not already indicate that the object was meta-locked, then the thread concludes that it has access to the monitor structures. Otherwise, the thread places itself in line for the meta-lock acquisition.

A thread that has acquired the meta-lock makes whatever monitor-structure changes are necessary to the synchronization operation it is to perform, and it then releases the meta-lock by performing an atomic compare-and-swap operation, in which it replaces the previously read object-header contents if that header field's contents are those that the thread left when it obtained the meta-lock. If the contents have changed, then the thread had one or more successors. In that situation, it does not change the object-header contents but instead communicates to a successor what the replacement contents would have been, and the successor acquires the meta-lock.

The Agesen et al. arrangement provides for efficient and versatile synchronization. But it requires expensive atomic operations both to acquire and to release metalocks.

SUMMARY OF THE INVENTION

I have found a way to obtain essentially the same advantages as Agesen et al. but without needing the expensive atomic compare-and-swap operation for meta-lock release. In accordance with my invention, an object's monitor is inflated, as in the Agesen et al. and Bacon et al. approaches. And, as in the Agesen et al. approach, the header space required to support the monitor in absence of synchronization is very small. Indeed, it can be as small as single bit; my approach does not require "meta-locking," as the Agesen et al. approach does.

Specifically, a thread attempting to obtain a lock on an object consults a (potentially only one-bit) field in the object's header that contains synchronization information, and this information indicates whether the object's monitor has been inflated. If the monitor has not been inflated, the thread inflates the object's monitor and locks the object. If the object's monitor has already been inflated, and the monitor record into which the monitor has been inflated indicates that the object has been locked, then the thread attempting to obtain the lock increments a reference-count field in that monitor record to indicate that an additional thread is waiting to lock the object. It then repeats its reading of the synchronization information, typically after having had itself suspended and then having been awakened by another thread's action in releasing that other thread's lock on the object. It also reads the monitor record's lock indicator if the object's monitor is still inflated.

This process of re-checking the header synchronization information and the monitor record's lock indicator—and, typically, being suspended and subsequently awakened—is repeated until either the object's monitor is no longer inflated or its monitor record's lock indicator no longer indicates that the object is locked. In the latter situation, the thread locks the object by making the lock indicator indicate that the object is again locked, whereas the thread recommences the lock operation in the former situation. Thus attempting to obtain a lock typically involves the expense of performing multiple machine operations together atomically, as will be explained below. In accordance with my invention, though, the operation of releasing the lock requires no such atomic operations. Specifically, a thread that is releasing a lock reads the reference count in the monitor record and changes the object's synchronization information to indicate that the object's monitor is not inflated if the reference count indicates that no other thread is waiting for the object. But the lock-releasing thread deflates the monitor by performing that synchronization-information change without atomically with that change confirming by reading the reference count that no further thread is waiting for a lock on the object. Now, another thread may have synchronized on the object between the time when the unlocking thread initially read the reference count and the time at which it deflated the object, in which case the unlocking thread has deflated the object's monitor prematurely. An embodiment of the present invention will therefore check afterward to see whether the deflation it has performed was premature, and it will take steps to ensure that any other thread that has synchronized on that object in the interim recovers appropriately.

Although thus relying on a recovery operation may seem undesirable, because the recovery operation is relatively expensive, I have recognized that the overall expense of such a synchronization scheme is considerably less than that of one that employs atomic operations to avoid the need for a recovery scheme. This is because it is possible to make occurrences of such premature deflation extremely rare, so the cost on an average basis of occasionally performing a recovery operation is dwarfed by that of employing atomic operations to prevent the need for recovery.

BRIEF DESCRIPTION OF THE DRAWINGS

The invention description below refers to the accompanying drawings, of which;

FIG. 2, previously discussed, is a block diagram that illustrates the relationship between application source code and the resultant application;

FIG. 4, previously discussed, is a listing of Java-programming-language code that illustrates the use of synchronized operations;

FIG. 5, previously discussed, is another Java-programming-language listing that calls for a synchronized operation;

FIG. 6, previously discussed, is listing of byte code into which the FIG. 5 Java-programming-language code may be compiled;

FIGS. 8A and 8B together form a C-code listing of a locking operation performed by an embodiment of the present invention;

FIG. 9 is a C-code listing of an unlock operation performed by an embodiment of the present invention;

FIG. 10 is a diagram illustrating the monitor-record leaking that could occur in the absence of one of the illustrated embodiment's features;

FIG. 11 is a similar diagram illustrating the futile context switching that could occur in the absence of another of the illustrated embodiment's features; and FIG. 12 is a C-code listing of a routine that an embodiment of the present invention uses to read an object's hash value.

DETAILED DESCRIPTION OF AN ILLUSTRATIVE EMBODIMENT

Figure 1:
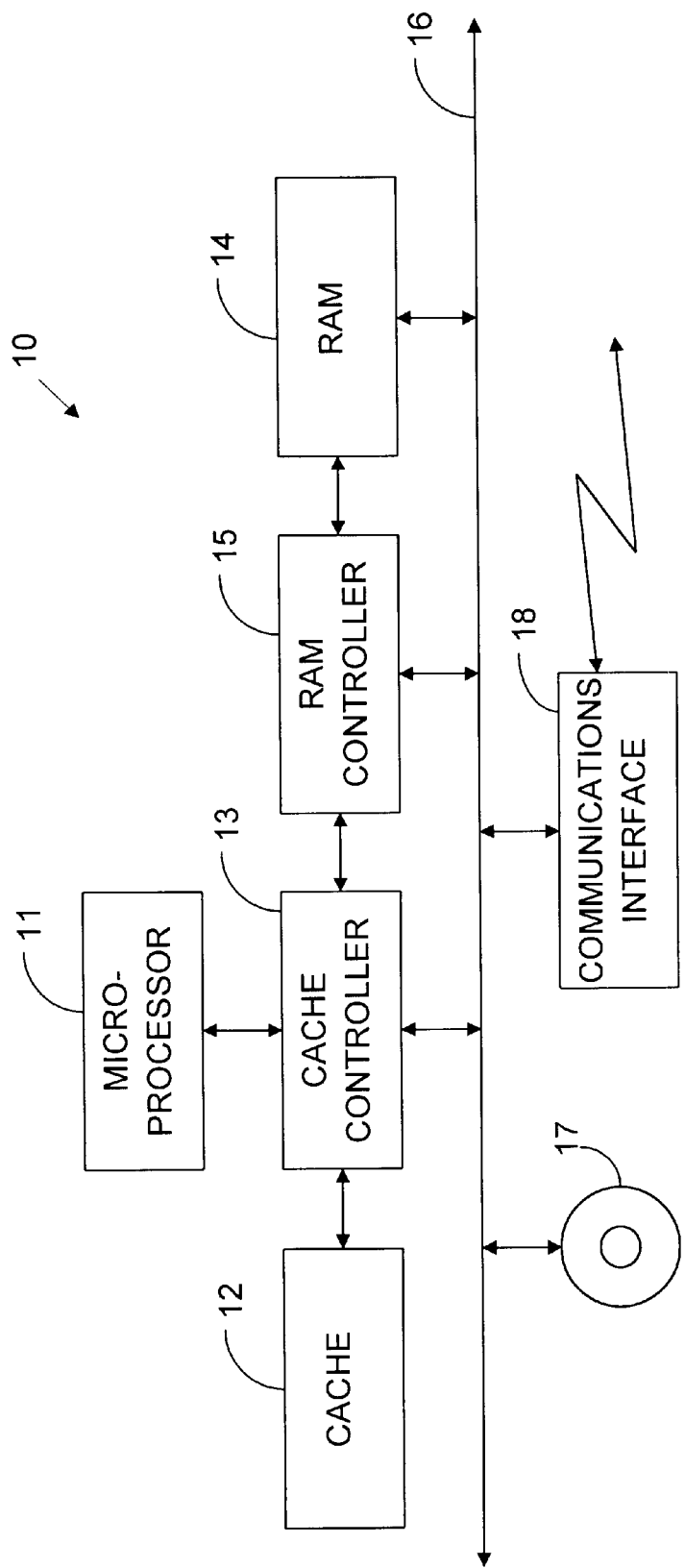
FIG. 1, previously discussed, is a block diagram of a typical computer system of the type in which the present invention's teachings may by employed.
Figure 3:
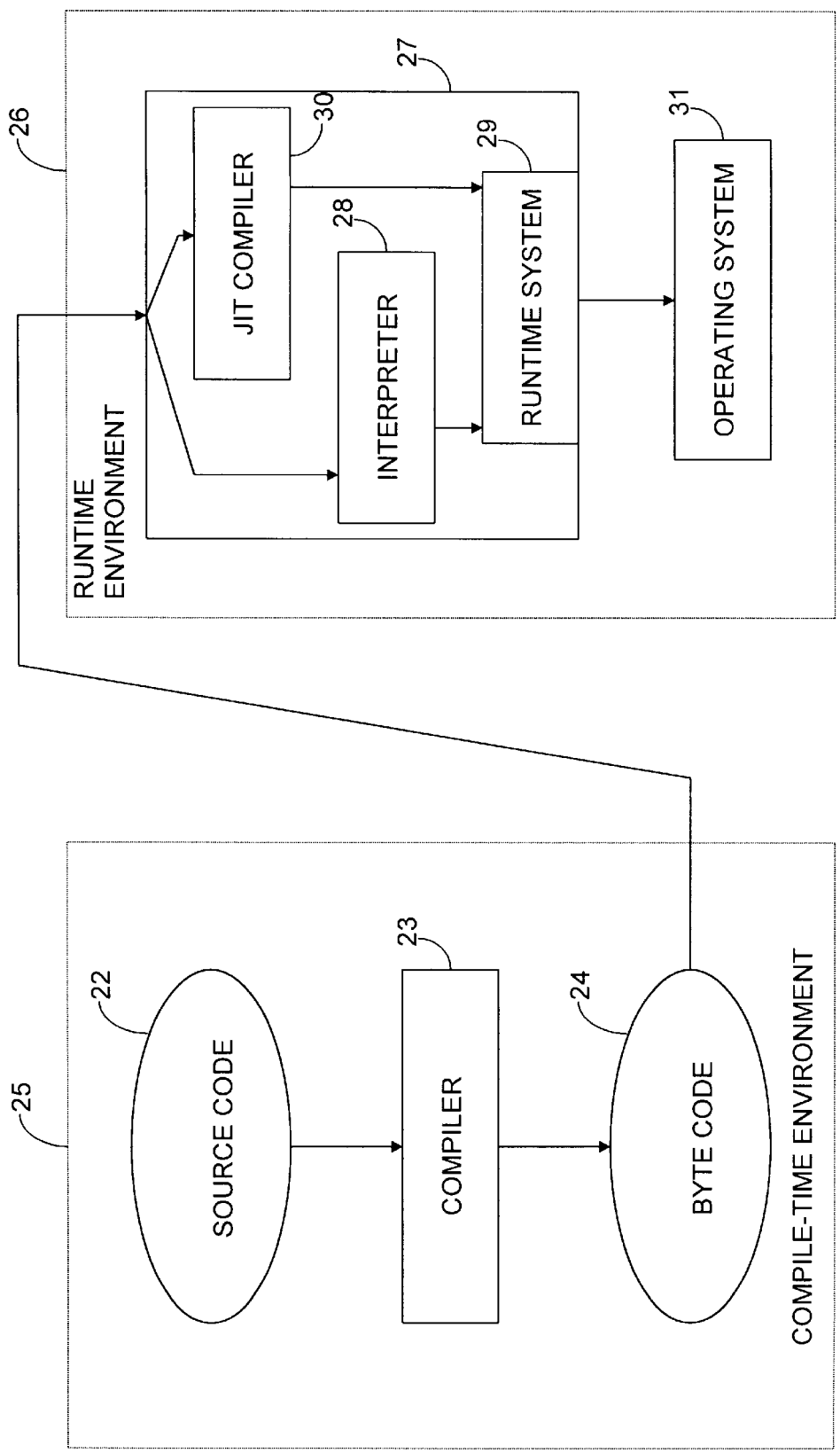
FIG. 3, previously discussed, is a block diagram that illustrates a somewhat more complicated relationship between source code and application execution.
Figure 7A:
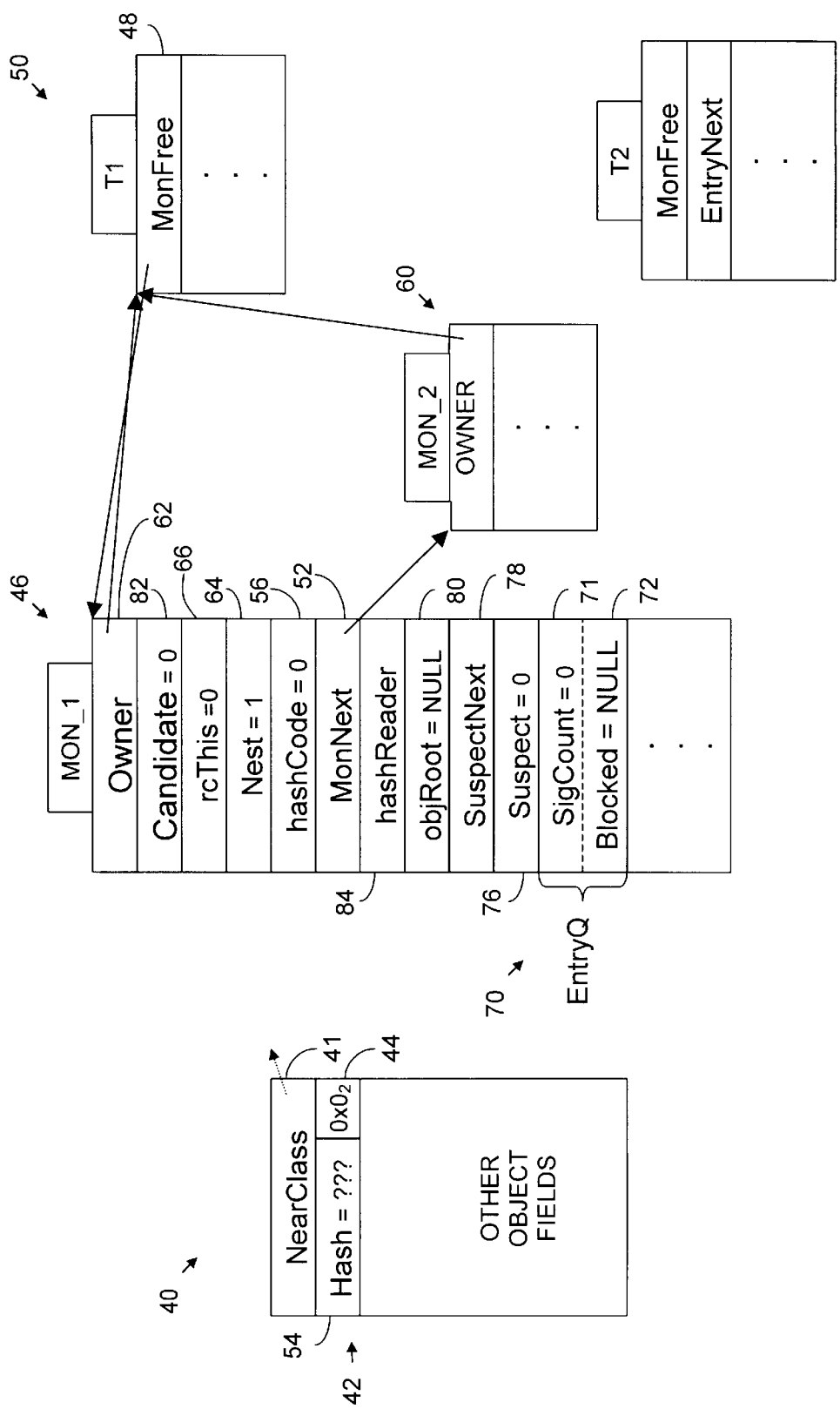
FIGS. 7A–7J are data-structure diagrams that illustrate the results of synchronization operations performed in accordance with an embodiment of the present invention.

FIG. 7A depicts data structures that will be used to illustrate the present invention's approach to locking and unlocking objects. Data structures used to represent objects come in many formats, and, with one exception described below, the particular format employed for the object is not critical to use of the present invention's teachings. But just about any compiler/interpreter intended for use with object-oriented languages will include in each object's structure an identifier of the class of objects to which it belongs. This is true, for instance, of objects manipulated by a Java virtual machine, and we will describe the invention in connection with such objects for the sake of example. So FIG. 7A depicts an object structure 40 as including a NearClass field 41 containing a pointer to the object structure that represents the class of which object 40 is an instance.

Typically, such a class-identifier field occupies a single word, i.e., a block of memory of the size that the target computer most frequently loads or stores in response to a single machine instruction. This field is part of what is typically referred to as the object structure's header, i.e., the part dedicated to overhead information, as opposed to the actual elements specified by the object-oriented-language programmer. There typically are other header fields that serve other overhead purposes. Whatever other such header fields there may be, compiler/interpreters that employ the present invention's teachings will also include synchronization information in its object structures' headers.

Now, when an object is locked, it is necessary to indicate not only whether it is locked but also what thread has locked it and what threads are waiting to lock it. But the overwhelming majority of objects are never locked, so it would be wasteful to provide enough room to contain all this information in every object's header. Instead, the header's synchronization information, or "monitor," is "inflated" when the object becomes locked. That is, a "monitor record" structure large enough to contain additional synchronization information becomes associated with the object. An aspect of the present invention concerns itself particularly with "deflating" an object's monitor, i.e., with dissociating the monitor record from the object when it is no longer to be locked. But we will first illustrate various locking situations to set the groundwork for illustrating a way in which the present invention's teachings may be implemented.

First we illustrate uncontested locking, beginning with the state that FIG. 7A depicts. In this state, the object's monitor has not been inflated, and all of its synchronization information resides in what I will refer to here as "lock word" 42. When a thread is to execute a synchronized method, or to perform some other code block that is synchronized on an object, the thread must first obtain a lock on the object. It can obtain a lock on an object only if no other thread has locked that object. To determine whether any other thread has locked the object, a thread attempting to obtain a lock on object 40 begins by reading that object's lock word 42.

Although the thread reads the entire lock word, the part that is of particular interest in this context is its inflation-state field 44. In principle, the present invention's teachings could be employed with an inflation-state field consisting only of a single bit, to indicate whether the object's monitor is inflated or not. Indeed, that field's least-significant bit does just that. As FIG. 7A shows, though, that field as three bits wide in the illustrated embodiment, for reasons that will become apparent. In FIG. 7A, the least-significant bit is a zero, indicating that the object's monitor is not inflated. Since the monitor needs to be inflated to contain all information to describe a lock, and, since the least-significant bit in FIG. 7A indicates that the monitor is not inflated, FIG. 7A depicts a situation in which the object is not yet locked. To illustrate how a thread obtains a lock in the absence of contention, we describe a scenario that starts in the FIG. 7A state.

FIGS. 8A and 8B (together, "FIG. 8") set forth a simplified routine, here called monEnter( ), that a thread uses in attempting to obtain a lock. The seventh and eighth lines of that listing represent reading the lock word and determining whether its, inflation-state indicator indicates that the object is inflated. Since the inflation-state indicator in FIG. 7A indicates that the object's monitor in not inflated, a thread that executes monEnter( ) in connection with object 40 encounters a positive outcome from the eighth line's test. This means two things. First, the thread is free to obtain the desired lock if no other thread interferes in the interim. Second, it must inflate the object's monitor to do so.

As was stated above, inflation involves associating a monitor record with the object, so the thread may allocate memory for such a record at this point. Preferably, though, the computer/interpreter will have so arranged the code that the computer system will have pre-allocated monitor structures for this purpose. A convenient way is to assign to each of the threads a linked list of monitor-record structures, exemplified by FIG. 7A's monitor record 46, that are not yet associated with any particular object. A pointer to this list is located in the MonFree field 48 of the "execution environment" structure 50 that the virtual machine uses to represent that thread ("thread T1") in memory. (The virtual-machine thread would in most implementations be mapped to an operating-system thread, to which further resources not shown will have been allocated.) In the illustrated embodiment, a MonNext field 52 in each monitor record is used to support the linked list.

This list of monitor records associated with a given thread can become empty. As the listing's ninth through eleventh lines indicate, therefore, the thread checks the MonFree entry for a NULL pointer and allocates a further monitor record for the thread if it concludes, from the presence of a NULL pointer, that the thread has no more monitor records in its list. As an alternative to thus explicitly testing monFree for a NULL pointer, the monEnter routine can instead simply assume a non-NULL pointer. The exception that is thrown as a result when the memory management unit attempts to dereference the NULL pointer can then be reported as a signal to the thread. The signal handler would allocate one or more monitor records to the thread and then unwind and restart the monEnter routine from the beginning.

Now, inflating an object's monitor means placing into the object's header (1) a pointer to the monitor record to which the monitor was inflated as well as (2) an indication that the inflation occurred. Actually, both of these may be the same in some of the present invention's embodiments; a NULL pointer may be taken as an indication that the object's monitor is not inflated. In the illustrated embodiment, though, a separate indication that the inflation occurred goes into the inflation-state field 44.

The field 44 that contains the inflation state is dedicated to that purpose in the illustrated embodiment, but the illustrated embodiment's pointer to the monitor record is written over a field 54 that normally contains other header information, as will be described below in connection with FIG. 8's seventeenth line. This other information may, as the drawings suggest, include a hash value, which object-oriented compiler/interpreters sometimes use in retrieving information associated with the object. In some embodiments, the pointer will instead or additionally be written over other information, such as the object's "age" information, which some embodiments use for garbage-collection purposes. In any event, the thread will need to store that displaced information elsewhere.

That storage occurs in the monitor record 46; FIG. 8's twelfth line represents storing the lock word's contents the monitor record 46's hashCode field 56. Now, the illustrated embodiment does not necessarily assign an object a hash value as soon as the object structure is allocated, so the inflation-state field's most-significant bit is used to indicate whether the object's hash field actually contains the result of hash-value generation. Although the object will not always have been assigned a hash value at this point, it is convenient for the hashCode field 56 actually to contain a hash value for the object when that location's contents are later retrieved. FIG. 8's thirteenth and fourteenth lines represent generating a hash value and placing it in the hashCode field 56 if the object header's inflation-state field 44 indicated that the object header's hash field 54 had not resulted from hash-code generation.

FIG. 8's seventeenth line represents the heart of the inflation operation. The CAS routine is a compare-and-swap operation. Its purpose is to place into the object's lock word a value that indicates that the object's monitor is inflated and that identifies the monitor record into which it was inflated. The thus-identified monitor record will indicate that the thread has locked the object. But remember that a thread can lock the object only if no other thread has locked it, and there is no guarantee that another thread has not locked the object since the no-inflation-indicating lock word was read in the seventh-line operation. So the CAS operation (1) re-reads object header 40's lock word 42 and, (2) if its value has not changed since the reading operation that FIG. 8's seventh line represents, writes a new value into it. It performs these two steps atomically: it performs the rereading, comparison, and writing operations without allowing any other thread access to the lock word. Particularly in a multiprocessor environment, such an atomic operation is expensive. Not only does such an operation consume many processor cycles, but it also generates a lot of bus and interconnect traffic. That is, it not only slows the thread that executes it but also impedes other threads' and processes' progress, thus detracting from scalability. But its use is necessary if the mutual-exclusion safety property is to be guaranteed, and this is true not only in multiprocessor systems but also in uniprocessor systems that, as most do, employ preemption.

The value that this operation places into the object header's lock word 42 if the lock word's value has not changed is derived from a pointer to the monitor record 46. Specifically, the MKMON macro replaces that pointer's three least-significant bits. The three replacement bits indicate that the object monitor is inflated and that a hash code has been generated for the object. No information about the monitor record's location is thereby lost, because monitor records in this embodiment are eight-byte aligned, so the three least-significant bits of their addresses are always zeroes. In short, the lock word now indicates that the object's monitor has been inflated, tells where the monitor record is, and indicates that a hash value has already been generated for the object. And, as will be seen below, the monitor record thereby identified indicates that the object is locked.

Figure 7B:
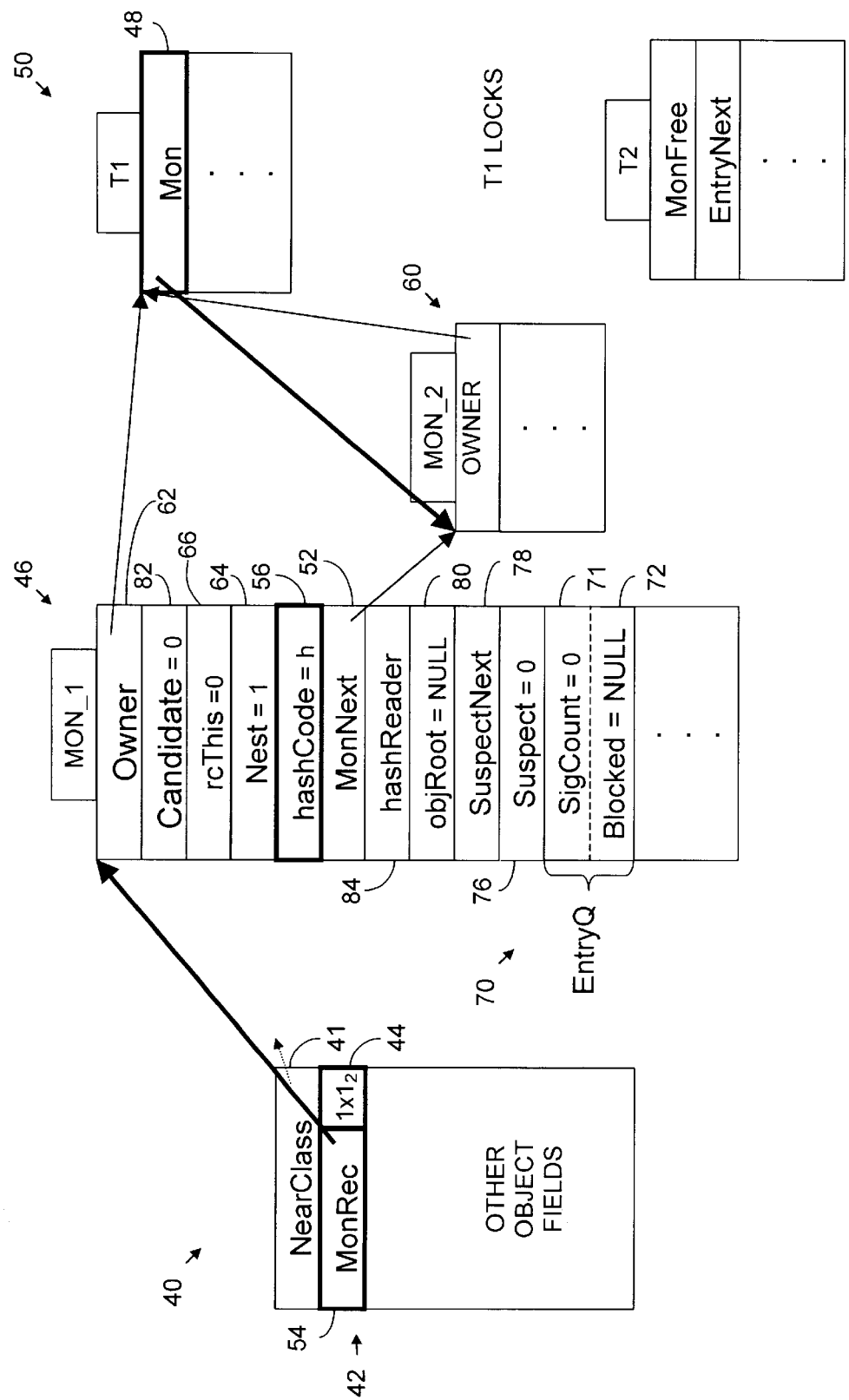

As was stated above, monitor record 46 was in a linked list of records not currently associated with any object and thus free to be used in connection with an object newly being synchronized on. Now that it is part of object 40's inflated monitor, though, record 46 is no longer free, so it must be removed from the thread's free list. As FIG. 8's sixteenth and eighteenth lines indicate, the thread therefore reads the monitor record 46's MonNext field, which is used for linking the list of free monitor records, and places this value into its execution environment 50's monFree field 48. As a result, that field now indicates that monitor record 60 has been placed at the head of thread T1's free list in place of record 46. As FIG. 8's nineteenth line indicates, monEnter then returns. FIG. 7B depicts the results of the foregoing operations.

The Java virtual machine supports recursive locking. That is, a given thread can lock an object without unlocking it after it has already locked that same object. A recursively locked object remains locked until the thread that locked it has performed as many unlock operations as it has lock operations. To illustrate this, let us now assume that the thread proceeds to lock the object again. In executing the monEnter routine for that purpose, the thread again performs the operation that FIG. 8's eighth line represents: it determines whether the object's synchronization-state indicator 44 indicates that the object has been inflated. This time, though, the object's monitor is indeed inflated, and the thread skips the block that FIG. 8's lines 8–22 represent.

The thread then needs to determine whether the object is already locked, and that information is in the monitor record 46. To find that record, the thread obtains a pointer to it by, as FIG. 8's twenty-fourth line indicates, performing the MONREC macro, which returns the result of setting to zero the three least-significant bits of the object's lock word. Having thereby found monitor record 46, the thread inspects that record's Owner field 62 to determine whether the object is locked. A monitor record's Owner field 62 serves both as a lock indicator and as an identifier of the lock owner. If the Owner field contains a NULL value, then the object with which the monitor record is associated is not locked. Any other value indicates that the object is locked and identifies the locking thread by, for instance, pointing to the locking thread's execution environment.

In the illustrated scenario, the Owner field 64 in FIG. 7B contains a pointer to thread T1's own execution environment 50. In the illustrated embodiment, this is because all of the monitor records initially placed in a given thread's free list are initialized with Owner fields that have pointers to that thread's execution environment. The operation represented by FIG. 8A's twenty-fifth line determines from that pointer's value that thread T1 is itself the owner of the lock on the object that it is attempting to lock. In this situation, the thread merely increments the contents of the monitor record's Nest field 64, as FIG. 8A's twenty-sixth line and FIG. 7C indicate, to show the depth to which locks have been recursively "nested."

Figure 7C:
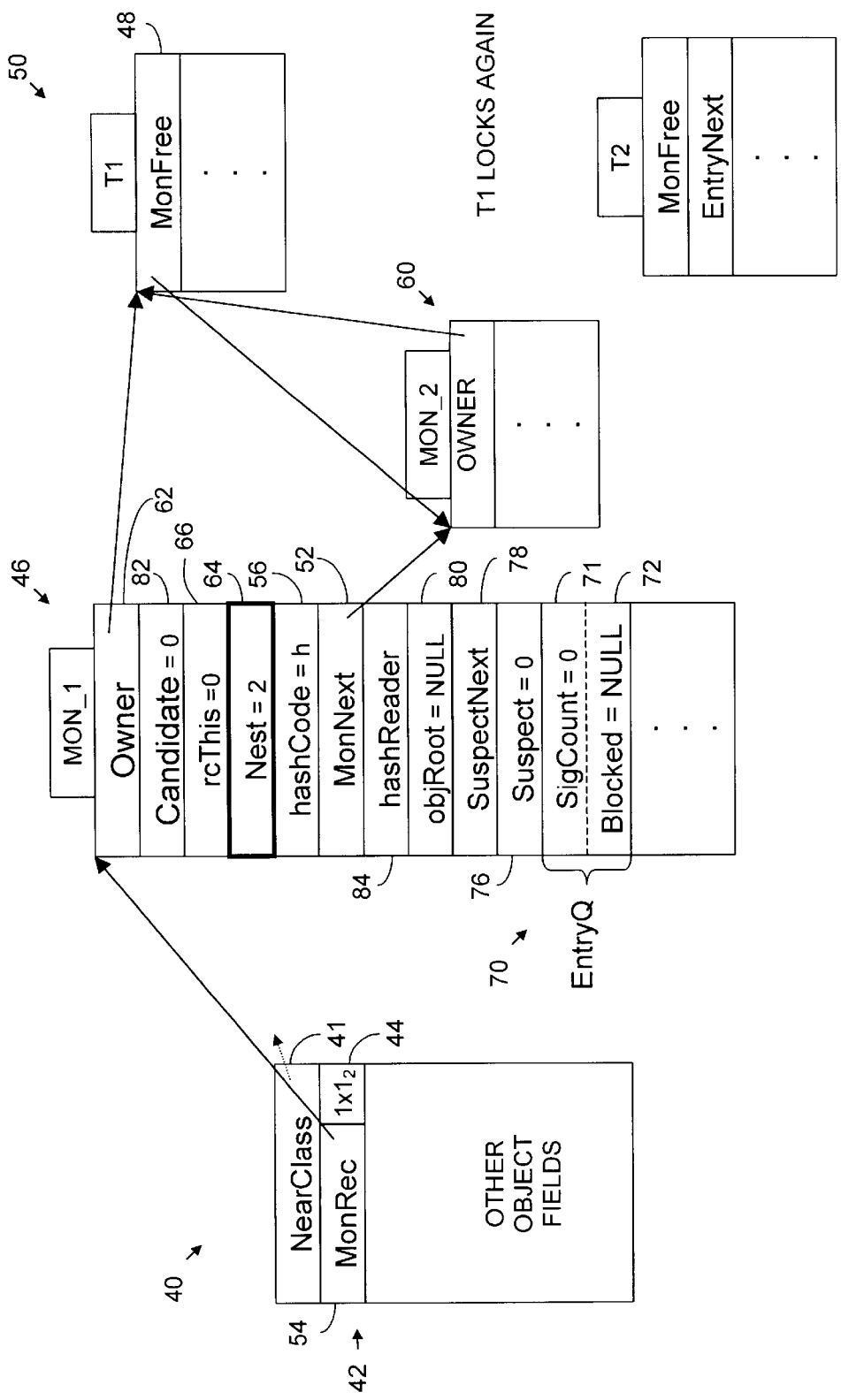

When the thread is then to unlock the object, it executes the monExit routine that FIG. 9 depicts. As FIG. 9's ninth and tenth lines indicate, the thread determines whether decrementing the contents of the monitor record's Nest field 62 would reduce it to zero. Since that field's value in the state depicted in FIG. 7C is two, decrementing it would reduce it only to one, so the condition set forth in FIG. 9's tenth line is not met. The thread therefore skips the steps represented by the FIG. 9's twelfth through twenty-eighth lines and merely decrements the contents of the monitor record's Nest field.

When thread T1 returns to unlock the object the second time, though, the test of FIG. 9's tenth line yields a positive outcome. So the lock that it is in the process of releasing is its last one on the object. As will be explained below in more detail, a value of zero in the monitor record's rcThis field 66 indicates that no other thread is employing the monitor record, either. So the thread confirms that the contents of the monitor record's rc This field is zero, as FIG. 9's eleventh line indicates, before performing the twelfth line's operation of deflating the object's monitor by replacing the contents of the object's lock word with those of the monitor record's hashCode field 56.

Recall that the hashCode field's contents were generated in the operation that FIG. 8's fourteenth line represents. In the system in which the illustrated embodiment is employed, the global variable gcHash used in that line is given a new random value during each garbage-collection cycle. Because of the object alignment in the illustrated embodiment and the nature of the operation by which the rcHash global variable is updated, the least-significant bit of the fourteenth line's result is guaranteed to be zero and third-least-significant bit is guaranteed to be one. So the operation of FIG. 9's twelfth line places into the object's lock word a hash value and an indication that the object has been assigned a hash value but that its monitor is no longer inflated.

Figure 7D:
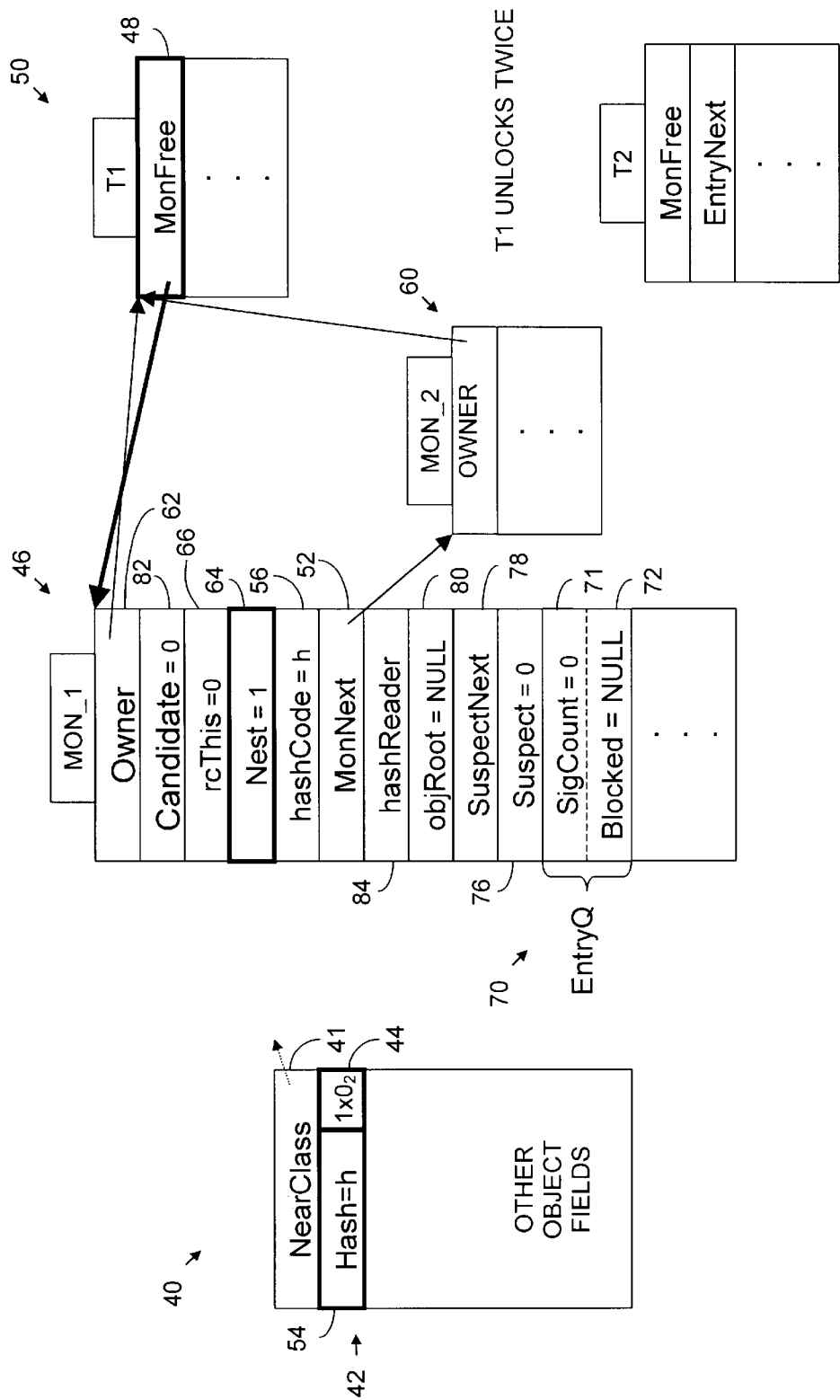

After performing several of FIG. 9's steps whose purpose will be explained below, the thread in this scenario performs the sixteenth line's ReturnToFreeList routine, whose result FIG. 7D illustrates. Specifically, thread T1's execution environment 50 receives in its MonFree field 48 a pointer to the first monitor record 46 rather than the second monitor record 60; it thereby returns monitor record 46 to thread T1's free-monitor-record list. As FIG. 9's seventeenth line indicates, the routine then returns.

Figure 7E:
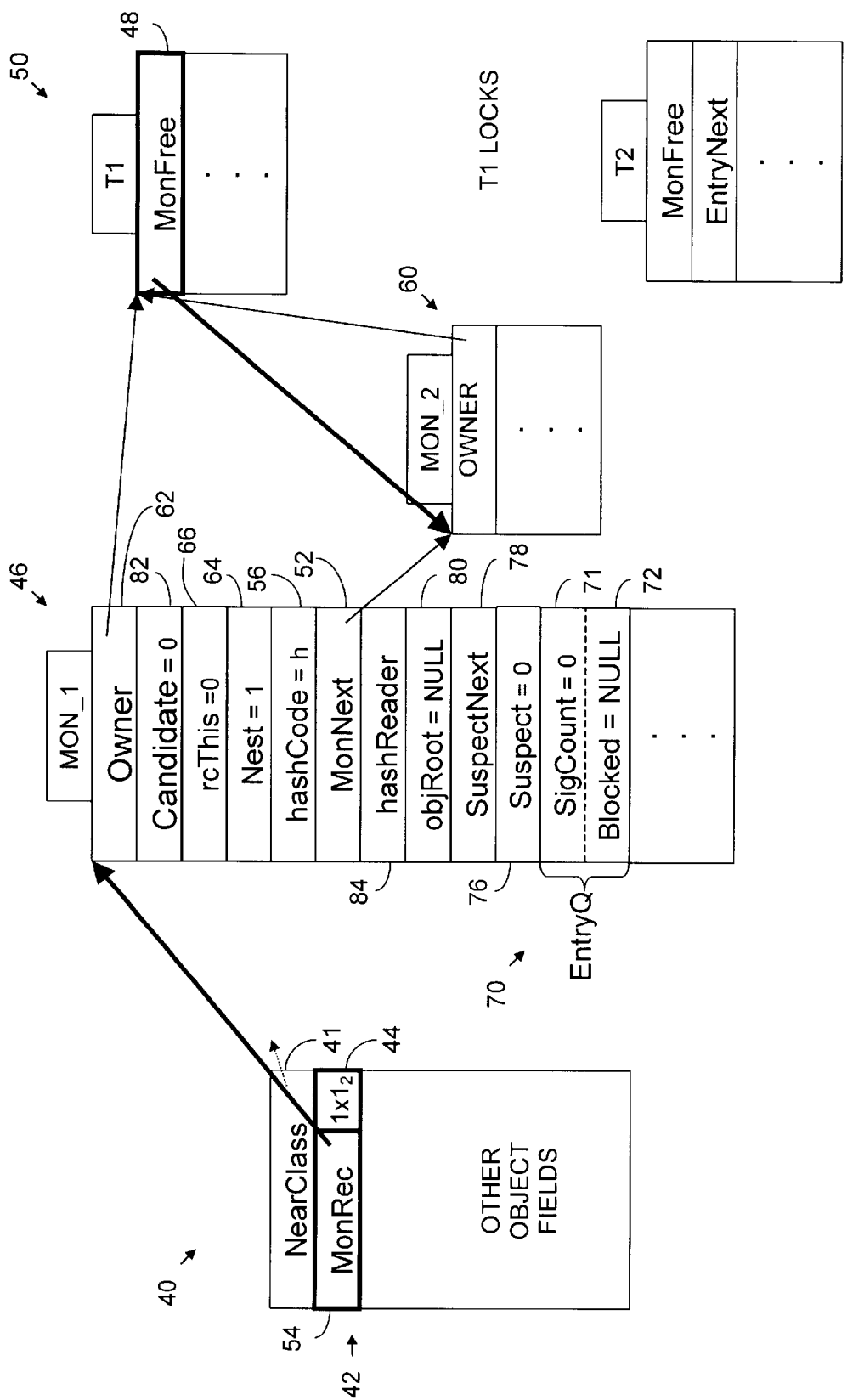

The scenarios described so far illustrate only uncontested locking. That is, only a single thread has locked and unlocked the record; that thread has not had to wait for another thread's lock to be released. To describe what happens when a second thread attempts to obtain a lock while another has already locked the object, we set the stage by beginning in the state represented by FIG. 7E. Just as FIG. 7B does, FIG. 7E represents the state in which thread T1 has just locked the object.

Now consider what happens when, with the object thus locked, another thread, thread T2, attempts to obtain the lock on the object, i.e., executes the monEnter routine of FIG. 8. Again, the non-inflation condition that FIG. 8's eighth line imposes is not met, so thread T2 skips the block represented by FIG. 8's ninth through twenty-second lines. It performs the twenty-fourth line's step of obtaining from the lock word a pointer to the lock record by which the object's monitor is inflated, and it determines, by the step represented by FIG. 8's twenty-fifth line, whether it is the owner of a lock on the object. Since thread T1 is actually the owner, thread T2 skips to the step represented by FIG. 8A's thirtieth line. The first part ("m–>Owner ==NULL") of the condition represented by that line tests whether the object is unlocked, i.e., whether there is no owner. Since there is an owner, namely, thread T1, thread T2 skips the block represented by FIG. 8A's thirty-first through thirty-ninth lines.

It then performs the reference-count-incrementing operation that FIG. 8's forty-second line represents. This is an atomic fetch-an-add operation on the monitor record's rcThis field 66, which contains the reference count. That is, without permitting interruption by any other thread, thread T2 reads the value of rcThis, increments the value that is has read, and then stores this incremented value back into rcThis, thereby leaving an indication that a thread is attempting to use that monitor record to obtain a lock on the object. This operation's purpose is to inhibit inflation, i.e., to force the monitor record to remain associated with the object. By thus indicating that it is using the monitor record, it notifies any lock-releasing thread that it should not return the monitor record to its free list. That is, it should not disassociate the monitor record from the object whose monitor it has been used to inflate, as thread T1 did in the preceding scenarios, in which rcThis was zero.

FIG. 8's forty-third line represents confirming that the object's lock word 42 has not changed since thread T2 commenced the monEnter routine; if it had, then the thread could infer that the action of another thread had in the interim dissociated monitor record 46 from object 40. In the present scenario, though, no such change occurred. So monitor record 46 is the appropriate record to use to record thread T2's state of waiting to obtain a lock on object 40.

Figure 7F:
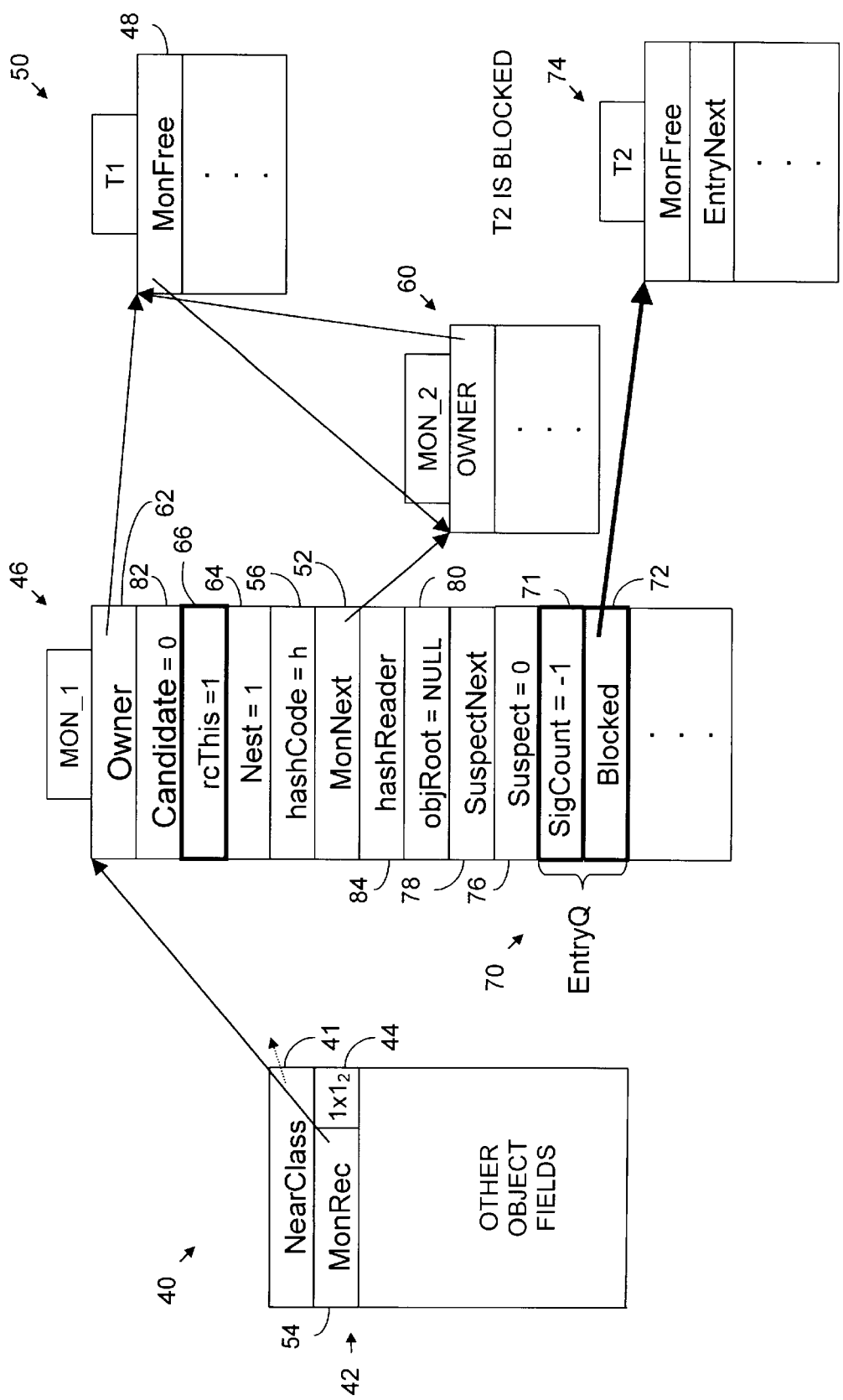

Thread T2 therefore skips the steps represented by the block of FIG. 8's forty-ninth through fifty-fifth lines, and it makes the system call that FIG. 8's fifty-sixth line represents. Specifically, it performs a semaphore-wait operation in which it joins the linked list of monitor records that are "blocked" on monitor record 46's system-level entryQ semaphore 70. Blocking is logically equivalent to spinning in this context, but it is preferable to it because it does not waste processor cycles. In this case, no other threads are already blocked on that semaphore. We also assume that the semaphore has accumulated no unused signals, i.e., that its signal count is zero, as its signal count field 71 indicates. As a result, thread T2 places itself at the head of the list by placing into that semaphore's Blocked field 72 a pointer to its execution environment 74. If a subsequent thread becomes similarly blocked while thread T2 remains blocked, it would add itself to the list by placing a pointer to the subsequent thread's execution environment into one of thread T2's execution-environment fields (not shown) used to support the list of blocked threads. Thread T2 also "goes to sleep": it has the operating system suspend it without placing it back on to the operating system's ready queue, i.e., on the queue of threads that can be allocated processor time. So the operating system does not accord it any time until another thread "signals" the entryQ semaphore 70, i.e., until another thread transfers a thread from that semaphore's queue of blocked threads back to the system's ready queue. This is the state that FIG. 7F represents.

In the scenario here, thread T1 then executes FIG. 9's monExit routine to release its lock. In performing monExit, thread T1 proceeds as it did previously, except that it cannot confirm the condition that FIG. 9's eleventh line imposes. Since rcThis is not equal to zero, that is, it cannot confirm that no other thread is currently employing the monitor record in connection with the object. So thread T1 cannot deflate that object's monitor; it must let monitor record 46 remain associated with object 40. It therefore skips the block represented by FIG. 9's twelfth through twenty-second lines and instead executes the one that FIG. 9's twenty-third through twenty-eighth lines represent.

Figure 7G:
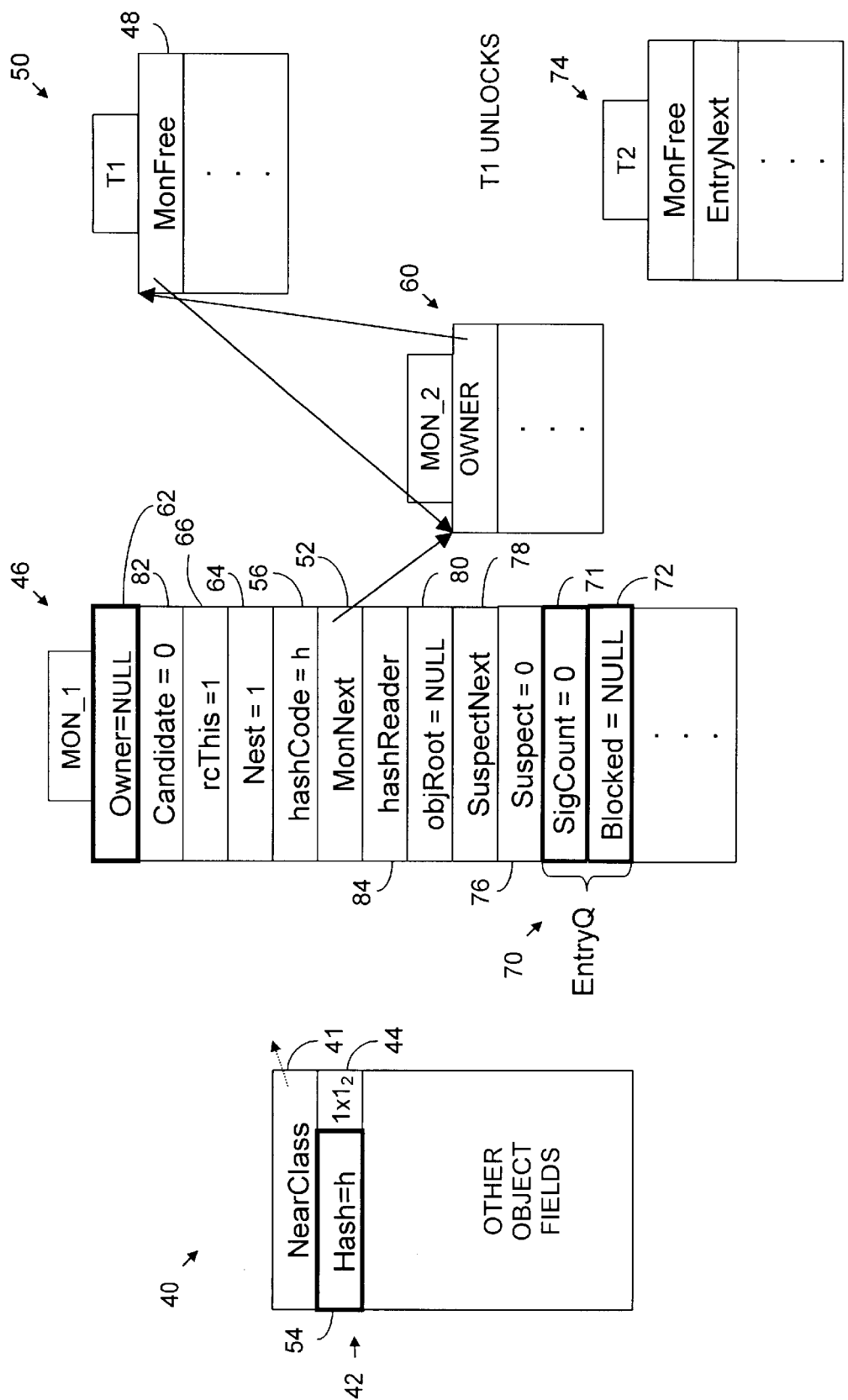

In addition to other steps, whose purposes will be explained below, this block includes the step that the twenty-fourth line represents, namely, that of placing a NULL value in monitor record 46's Owner field 62. This shows that the object associated with the monitor record 46 is no longer locked. Thread T1 additionally executes a monWakeUp routine that, among other things, includes signaling monitor record 46's entryQ semaphore 70. As was just explained, this means that it removes a thread from the linked list of threads blocked on the entryQ semaphore 72 and "wakes it up": it places it into the operating system's ready queue, i.e., its queue of threads that can be allocated processor time. In this case, there is only one such thread, namely, thread T2, so thread T1 wakes up thread T2. FIG. 7G depicts the resultant state.

Figure 7H:
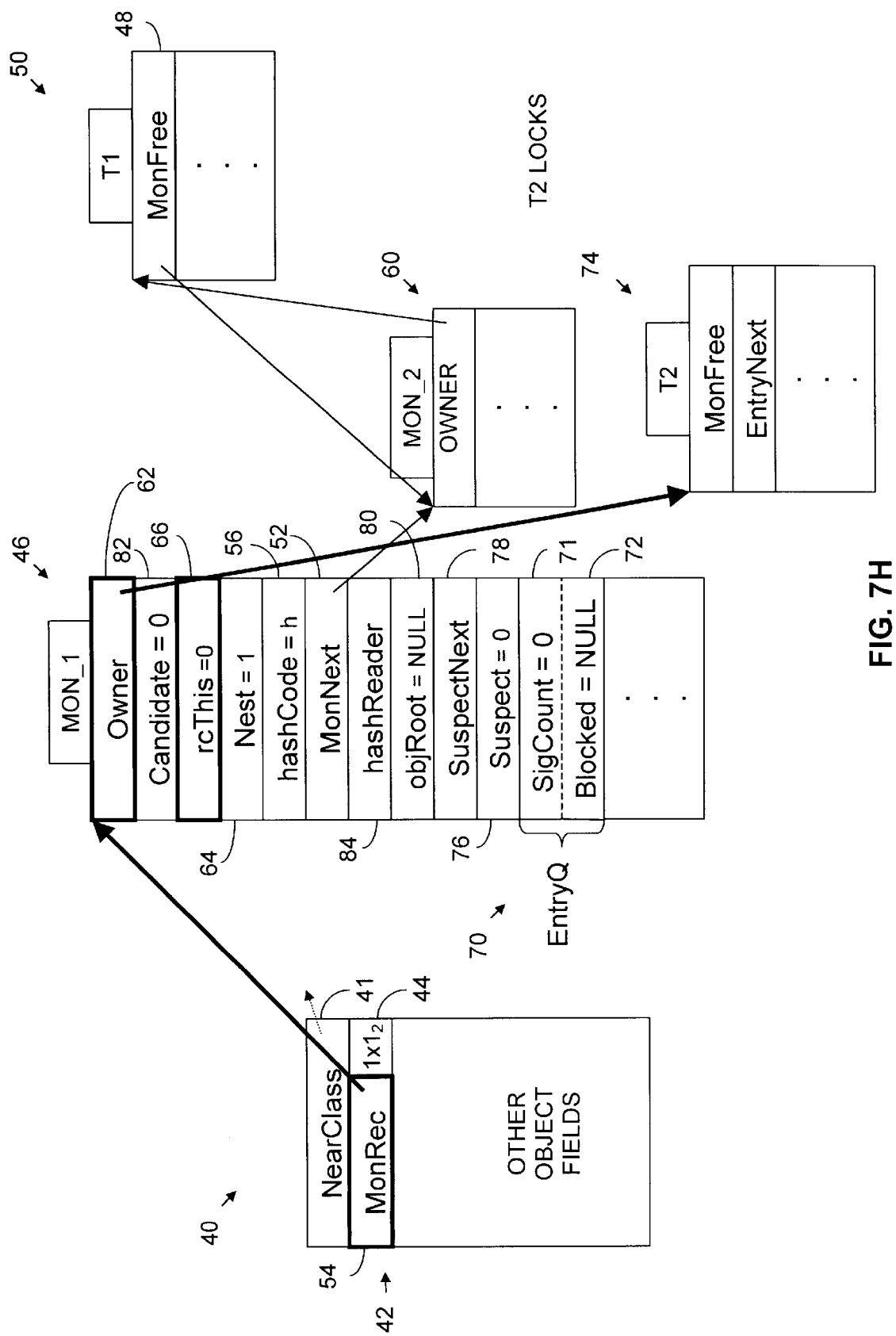

When thread T2 wakes up, it finds itself in the loop that extends between FIG. 8's forty-eighth and fifty-eighth lines. Specifically, it begins at the step that the forty-eighth line represents, and it continues as before until it reaches the fifty-first line's step. This time, the stated condition's first part ("m->Owner ==NULL") yields a positive result, indicating that the object is unlocked, so the thread performs the fifty-first line's compare-and-swap operation. That is, it atomically confirms that the monitor record 46's Owner field still contains a NULL value and, on the basis of that confirmation, places into that field a pointer to its own execution environment 74. Again, the verification and value replacement are performed atomically so that no other thread can obtain a lock between the verification and value replacement by which a lock is obtained. FIG. 7H depicts the result.

We now turn to an operational sequence that illustrates the present invention's "speculative deflation" feature. In this sequence, thread T2 is to release its lock on the object. In doing so, it begins FIG. 9's monExit routine as before. To illustrate the speculative-inflation feature, we assume that the operating-system kernel preempts thread T2's execution immediately after that thread has performed the step of FIG. 9's eleventh line. Just before the kernel preempts it, that is, thread T2 finds that monitor record 46's rcThis field 66 contains a zero value, so thread T2 concludes that no other thread is currently employing that monitor structure for synchronization purposes, i.e., that the object's monitor can be deflated.

But we will further assume that another thread does begin employing the monitor record. Specifically, we assume that thread T1 begins FIG. 8's monEnter routine during thread T2's suspension in an attempt to obtain a lock on the object 40. The "relaxed" characterization of the present invention's lock mechanism arises from the fact that, when T2 resumes it monExit operation and deflates the object's monitor, that deflation is not performed as part of an atomic operation in which it first confirms that the monitor record remains free of references from other threads. Thread T2 therefore will not detect the result of thread T1's performing the operation of FIG. 8's forty-second line, in which that thread atomically increments the reference-count-containing rcThis field 66 to indicate that another thread is employing the monitor record for synchronization on the object.

Figure 7I:
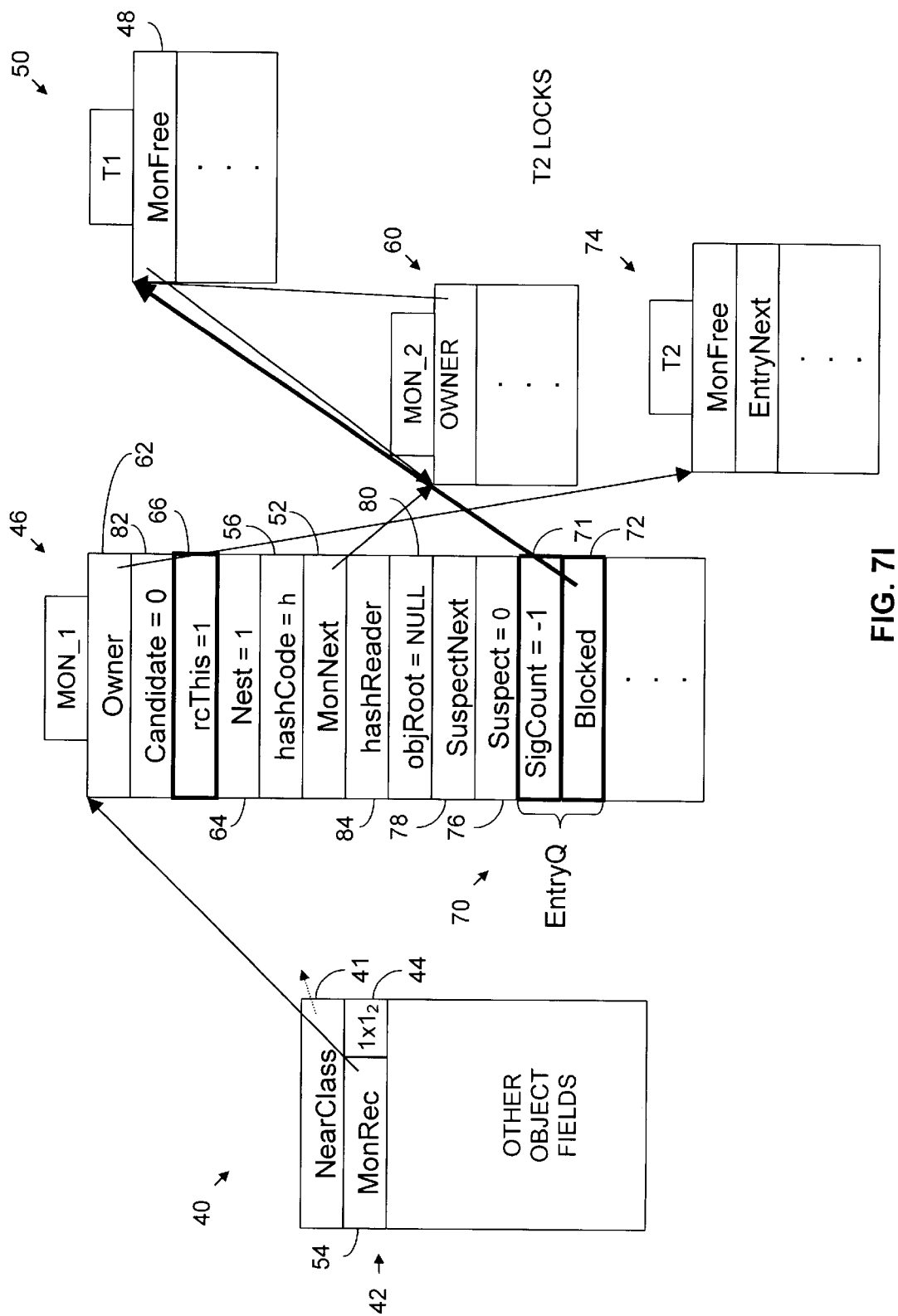

Thread T1 follows this step by performing the next line's step of confirming that the object's lock word has not changed since thread T1 previously read it. Since it has not, thread T1 skips the block set forth in FIG. 8's forty-third through forty-seventh lines, and it commences the operation represented by the block set forth in the forty-eighth through fifty-eighth lines. In performing the test that the fifty-first line represents, thread T1 finds that thread T2 has not yet relinquished its lock. So thread T1 skips to the fifty-sixth-line step of placing itself in the list to which the Blocked field of EntryQ semaphore 70 points. FIG. 7I illustrates the result.

We assume that thread T2 then resumes execution. As was mentioned above, though, it does not first stop to determine whether rcThis is still zero, as it was in the state that FIG. 7H showed. That is, it does not determine whether any thread started using monitor record 46 while thread T2 was suspended. So the deflation that the twelfth line's step represents occurs even though, contrary to what the eleventh-line determination indicates, another thread actually is using the monitor record. In short, thread T2 deflates object 40's monitor prematurely.

A conventional approach would be to prevent such premature deflation by performing the operations of the eleventh and twelfth lines atomically. This would prevent another thread from starting use of the monitor between the "owner" thread's determining that no other thread is using the monitor record and that thread's deflating the monitor on the basis of that determination. But I have recognized that it is preferable to allow such premature deflations and recover from them than to suffer the significant performance cost of avoiding them by using atomic operations. Since very few machine instructions would ordinarily occur between the reading operation of FIG. 9's eleventh line and the deflation operation of its twelfth line, the scenario just described, in which another thread places itself in the monitor record's entry queue in the interim, will be extremely rare. That is, the routine's fifteenth-line step of re-checking the reference count will almost always show that the monitor record remains free of waiting threads. So deflation will in almost every case be followed by the sixteenth and seventh lines' steps of putting the monitor record back into the thread's free list and returning from the monExit routine.

Except for the rare recovery operation to be described below, the only added cost is a "memory barrier." A memory barrier is an operation that deals with the fact that some systems employ processors in which a speed advantage is gained by not always executing machine instructions in precisely the order in which those instructions occur in the program code. For a single processor executing a single thread on unshared memory, the results that such processors produce by this out-of-order execution are the same as the results of executing the instructions in order. In multiprocessor, shared-memory systems, though, situations arise in which restrictions must be imposed on such out-of-order execution if the results are to be the same, and the illustrated embodiment presents such situations. To impose such restrictions, the illustrated embodiment includes memory barriers at places such as FIG. 9's thirteenth line. That is, it executes the MEMBAR(StoreLoad) macro, which causes all stores called for by preceding code to be executed—and their locally cached results to be made available to other processors—before the execution of any load (fetch) called for by subsequent code. A memory barrier does exact a cost, but it is minimal in comparison with the cost of, say, an atomic compare-and-store operation.

Figure 7J:
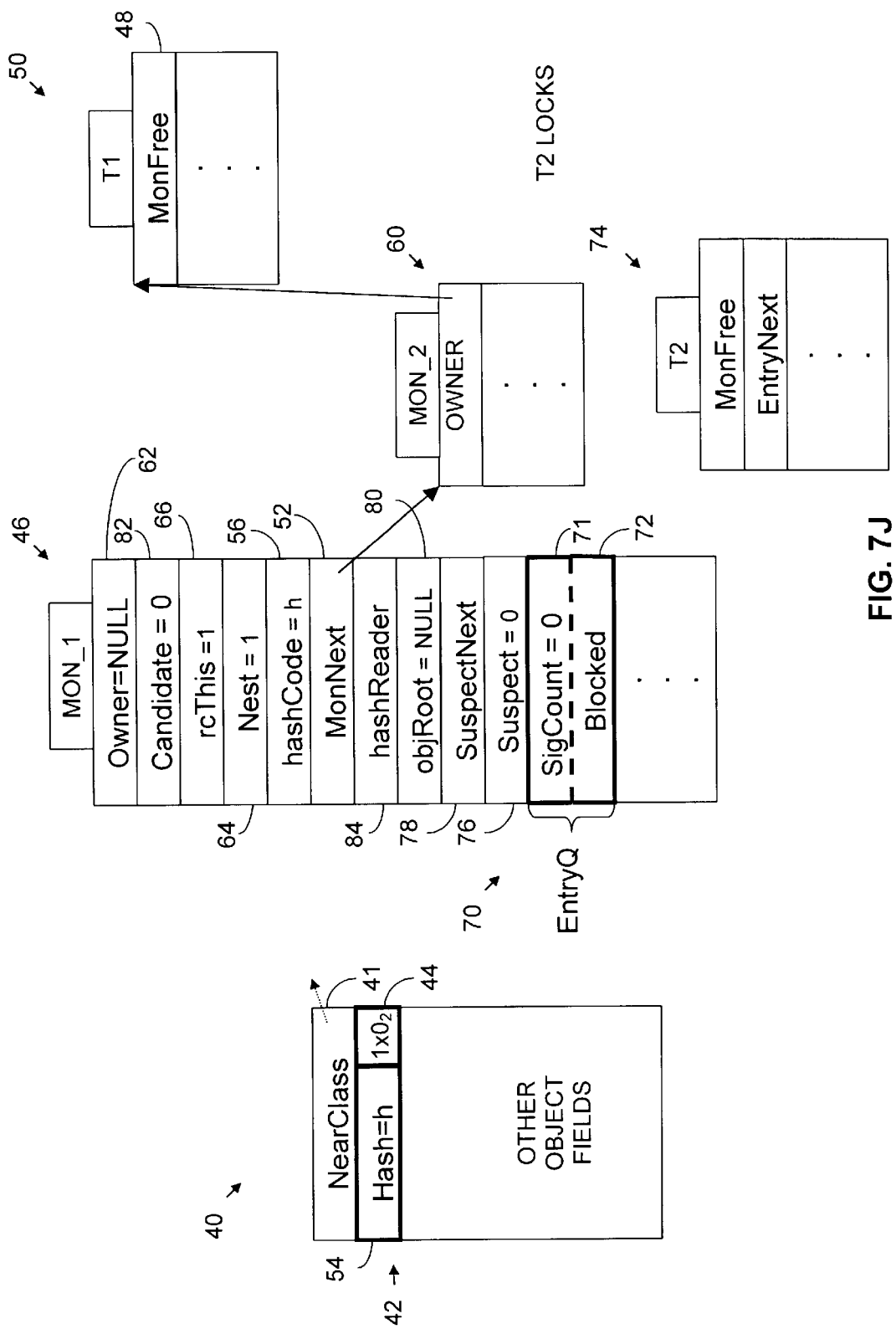

Now, the fifteenth-line determination will in very rare instances be that another thread did indeed start using the monitor record before the exiting thread performed its deflation. In those rare instances the exiting thread recovers by performing the nineteenth line's FlushAndFree routine. That routine "wakes up" all waiting threads. Specifically, it signals the EntryQ semaphore a number of times equal to the contents of the reference-count field rcThis. FIG. 7J represents the resultant state.

In the present scenario, the only waiting thread is thread T1. When it wakes up, it proceeds to the step of FIG. 8's forty-eighth line, namely, that of determining whether the lock word has changed. If it has, the monitor record that had appeared to be associated with the object may no longer be, so thread T1 skips the operations represented by FIG. 8's forty-eighth through fifty-eighth lines. It instead performs the fifty-ninth line's FlushAcknowledge routine, in which it notifies the flushing thread—here thread T2—that it has detected the deflation implied by the lock-word change. The flushing thread T2 waits for such notifications from every waiting thread before the FlushAndFree routine of FIG. 9's nineteenth line returns; This is because that routine also returns the monitor record to the flushing thread's free list, and it should not do this while other threads are still improperly blocked on it. Once FlushAndFree returns, so does the monExit routine, as FIG. 9's twentieth line indicates.

It may be preferred in some embodiments to avoid the latency that can result from the flushing thread's waiting for all "flushee" threads to notify it. An alternative approach that such implementations can employ is to add the monitor record to a special global linked list. While a monitor record is on this global list, it is out of general circulation, but a special, "janitor" thread would monitor that list. When the janitor thread finds that there is a monitor record on that list on which no further threads are blocked—i.e, i.e., from which all flushees have been vacated—it places that monitor record on a free list, so that monitor record can again become associated with an object to support a lock.

As FIG. 8's sixtieth line indicates, the flushed thread T1 follows its FlushAcknowledge routine by beginning the monEnter routine essentially from the beginning. That is, it again attempts to obtain a lock, and this time it typically would find that the object's monitor is deflated. It will thus have recovered from the premature inflation.

The illustrative scenarios do not exercise all features that FIG. 8's example code listing includes. That listing's forty-fifth line, for instance, calls a MarkSuspect routine. That subroutine call is intended to represent one way of dealing with the monitor-record "leakage" to which the illustrated embodiment as described so far would otherwise be vulnerable.

As was explained above, a monitor record should be dissociated from an object and placed in a free-record list when synchronization on that object has (perhaps only temporarily) been completed. That is, all extant monitor records should be either on a free list or associated with an object. And a monitor record associated with an object should either be locked (Owner !=NULL) or have a non-zero reference count (rcThis>0). A monitor record that fails this-criterion the record is said to have leaked: it remains allocated but will not be found for reuse, at least if synchronization does not again occur on the same object. But it still occupies memory, which is a fixed resource. This compromises an advantage of separate-monitor-record use.

FIG. 10 sets forth a scenario that illustrates how leakage can happen. As that drawing indicates, thread T2 begins the monEnter routine at time 1 to obtain a lock on object O. By executing that routine, it inflates that object's monitor into monitor record m. At time 2, which occurs after thread T2 has thereby obtained the lock, thread T1 begins the monEnter routine to lock the same object. In doing so, its reading of the object's lock word (in FIG. 8's seventh line) reveals that the object's monitor has been inflated into monitor record m. At time 3, before thread T1 has had a chance to increment that record's reference count rcThis, thread T2 executes monExit. In doing so, it (erroneously) infers from the not-yet-incremented reference count rcThis's value of zero that no other thread is currently using monitor record m, so it deflates object O's monitor. That is, it dissociates object O from monitor record m by making the change in its lock word that FIG. 9's twelfth line represents.

At FIG. 10's time 4, thread T2 then locks a different object P. It is only thereafter, at time 5, that thread T1 reaches the reference-count-incrementing step of FIG. 8's forty-second line. But this incrementing is based on thread T1's conclusion from reading object O's lock word at time 2 that the object is associated with that object instead of with object P, with which monitor record m is in fact associated. That is, thread T1 "thinks" it is generating an indication that another thread is waiting to lock object O, whereas it actually is generating an indication that another thread is waiting to lock object P. So, when thread T2 releases its lock on object P at time 6 by executing the monExit routine, its (erroneous) conclusion from performing the step that FIG. 9's eleventh line represents is that another thread is using monitor record m to wait for a lock on object P. It therefore skips the steps represented by the block of FIG. 9's twelfth through twenty-first lines: it does not deflate that object's monitor.

As was explained before, thread T1 will eventually perform the step that FIG. 8's forty-third line represents and thereby find that monitor record m is no longer associated with object O. As was also explained before, it will respond to this discovery by starting the monEnter routine over again to find out anew whether that object's monitor is inflated, and it will then proceed appropriately. By having prevented thread T2 from deflating object P's monitor, though, it has caused monitor record m to remain associated with object P even though no thread currently is synchronized on that object—or is certain to be in the future.

The MarkSuspect routine called in FIG. 8's forty-fifth line enables the system's garbage collector to catch this leakage. Assume that the monitor record in question is monitor record 46 of FIGS. 7A–J. The thread changes the contents of that monitor record's Suspect field 76 from zero to one to indicate that record has potentially leaked. It also places that monitor record into a linked list of such potentially leaked records by (1) placing into that record's SuspectNext field 78 the current contents of a global SuspectList variable, which points to the beginning of the list, and (2) replacing SuspectList's contents with a pointer to monitor record 46. At the next garbage-collection cycle, the garbage collector can then traverse that linked list to determine which of the list elements have NULL Owner-field value and thus have actually leaked. It recovers such records by, e.g., placing them in free-record lists.

When the garbage collector places a suspect-list monitor record into a free-record list, it must dissociate it from the object whose monitor remains inflated into it. The contents of the monitor record's objRoot field 80 assist the garbage collector in this task. When an unlocking thread releases its lock on an object without deflating the object's monitor, it stores a pointer to that object in the objRoot field 80 of the monitor record into which the object's monitor has been inflated, as FIG. 9's twenty-third line indicates. So the garbage collector need only follow that pointer and then deflate the pointed-to object in the normal manner.

Rather than thus recover from such leaks, one could instead prevent them. One approach, which can be realized on processors capable of both full- and half-word accesses, is what I call "word tearing." This involves providing the rcThis field as a half-worlld subfield of a full-word field called, say, DX. If DX's other subfield is called "GuardKey," the monEnter and monExit routines should be so adjusted that the GuardKey field changes whenever the monitor record is recycled, i.e., whenever the monitor that has been inflated into it is deflated. As will now be explained, a thread that increments the rcThis subfield does so with a compare-and-swap operation on the whole DX field, and this operation fails when the monitor record is stale.

One way to accomplish this is to use the GuardKey subfield to identify the thread that is trying to increment the reference count. Immediately after an unlocking thread writes the hash code back into the object header's lock word, it employs half-word access to write a NULL value into the dissociated monitor record's GuardKey subfield. In attempting to increment the rcThis field, a thread placing itself in line to obtain a lock performs a four-step operation. First, it employs a half-word access to write its execution environment's address EE into the GuardKey field, and it issues a memory barrier. Next, it fetches the value of the full-word DX field and stores it in a temporary variable T. As before, it then resamples the object's lock word. If the lock word's contents no longer point to the monitor record, it restarts the monEnter routine to assign a monitor record to the object or identify another record into which that object's monitor has been newly inflated. Finally, it attempts to store the full-word value <EE, T.rcThis+1>into the DX field by performing a compare-and-swap operation in which it compares <EE, T.rcThis>with that field's original contents.

If the compare-and-swap operation succeeds, then the reference count has been incremented safely. But any monExit call that occurs after the incrementing thread's storing EE into the GuardKey field but before the compare-and-swap operation will cause that operation to fail. So the incrementing thread's compare-and-swap operation simultaneously both increments the rcThis field and confirms that the monitor record is still associated with the object. The CAS can fail because the monitor-record reference is stale (the monitor record has been reassigned to another object) or because of interference with other entering threads attempting to increment the reference count. In both cases the incrementing thread simply restarts the monEnter routine, as was just explained.

In this approach, multiple entering threads can interfere with each other and prevent any thread from making progress. An approach to using the GuardKey field that avoids this problem is to have GuardKey act as the monitor record's incarnation value. In this approach, the monExit routine would increment the GuardKey subfield's contents when the monitor record recycles, immediately after the hash code has been stored into the object header's lock word, i.e., immediately after successful deflation.

In this approach, reference-count incrementing would be performed in a three-step operation. First, the monEnter routine would fetch DX's value and store it in a temporary variable T. It would then resample the object's lock word. If the lock word's contents no longer point to the monitor record; it would. restart the monEnter routine as before. Otherwise, as in the first GuardKey approach, it would attempt to store the full-word value<incarnation, T.rcThis+1>into the DX field by performing a compare-and-swap operation in which it compares <incarnation, T.rcThis>with that field's original contents. The changed incarnation field would serve as an indication that the monitor record had been deflated and would prevent a thread holding a stale monitor-record pointer from incrementing the reference-count field rcThis. Conventional bounded-tag techniques can prevent any errors that could otherwise result from an overflow of the GuardKey value.

As was the case with the previous approach, the compare-and-swap operation desirably fails in this approach if the monitor record has recycled. But reflection reveals that this approach differs from the previous one in that it is not vulnerable to blocking by multiple entering threads.

Another field that the illustrated embodiment's monitor records include is the Candidate field 82. This field is used to minimize the futile context switching that could otherwise result from the fact that a waiting thread must compete with other threads for a lock when it is awakened.

FIG. 11 depicts a scenario that illustrates futile context switching. After thread T1 locks an object O, threads T2, T3, and T4 block on that object at times 2–4. That is, having attempted to obtain a lock but found it already taken, they place themselves in the linked list of waiting threads pointed to by the Blocked pointer 72 in the monitor record's EntryQ semaphore, and they have themselves put to sleep. When thread T1 then unlocks the object at time 5, it signals on the semaphore and thereby has thread T2, which is the first, "heir apparent" thread on the list, placed on the system's ready queue so that the kernel will eventually awaken it to lock the object. Thread T1 is still executing in the illustrated scenario, though, and its continued execution includes again locking and unlocking the object two more times, moving a different waiting thread to the ready queue each time it unlocks the object. So all three:otherithreads are on the ready queue when the kernel preempts thread T1 at time 11.

Futile context switching will occur in this scenario, because thread T1 has again locked the object when the kernel preempts it. When the kernel wakes each of the other threads, that is, each promptly blocks again, as the illustrated scenario shows at times 12–16: the context switching involved in waking those threads is futile. To avoid futile context switching the illustrated embodiment uses "throttling." As will now be seen, throttling limits the number of heirs apparent to one. That single heir apparent can still wake up, contend for the lock, fail, and reblock itself, but the rate of such futile context switching is greatly reduced.

Specifically, a thread attempting to lock an object sets the Candidate field 82 to one, as FIG. 8's forty-ninth line indicates. When the thread holding the lock releases it, the monWakeup subroutine that it calls at FIG. 9's twenty-sixth line tests the Candidate field. It then moves the next EntryQ thread to the system's ready queue only if the candidate field's value is one, and it sets that field's value to zero. So, in the FIG. 11 scenario, threads T2, T3, and T4 would set the Candidate field to 1 and at times 2, 3, and 4. Thread T1, finding a 1 in the Candidate field,.would place thread T2 on the ready queue as before. But thread T1 would also set the Candidate field to zero. This means that it would not similarly move threads T3 and T4 to the ready queue at times 7 and 9. So, although the kernel does find thread T2 on the ready queue at time 11 and therefore causes it to resume futilely, it does not engage in FIG. 11's further futile context switches at times 14 and 16, because, having encountered zero values in the Candidate field at times 7 and 9, it has not placed them in the ready queue.

A thread that needs to read the object's hash value while some other thread (or the same thread) is synchronized on that object uses a further field, the hashReader field 84, to avoid errors that monitor-record reuse might otherwise cause. To understand the type of error that might otherwise arise, assume that a hash-reading thread T1 is attempting to read the hash value of an object O whose monitor a locking thread T2 has inflated into a monitor record m. To locate object O's hash value, thread T1 derives-from object O's lock word a pointer to monitor record m, whose hashCode field currently contains the hash value. But further assume that, before thread T1 can read the hash value from monitor record's hashCode-field, thread T2 deflates object O's monitor and reuses monitor record m to inflate the monitor of another object, object P. Thread T1 would then read object P's hash value rather than that of the intended object, object O.

Now, thread T1 could try to avoid the error by afterward checking object O's lock word to determine whether it still points to the same monitor record and, if not, starting the hash-reading operation over again. But an error could still occur, because thread T2 could deflate object P's monitor and reinflate object O's into monitor record m between thread T1's reading of the hashCode field and its rechecking of the object's lock word.

The illustrated embodiment takes three measures to avoid such errors. First, a hash-reading thread in the illustrated embodiment writes its identity (e.g., a pointer to its execution environment) into the monitor record's hashReader field before it reads the hashCode field's contents. Second, when an unlocking thread deflates the monitor that had been inflated into that monitor record, the unlocking thread writes a reserved value, say, NULL, into that monitor record's hashReader field, as FIG. 9's fourteenth line indicates. Third, after the hash-reading thread reads the hashCode field's contents, it confirms that neither the object's lock word nor the monitor record's hashReader field has changed. If either has, the hash-reading thread concludes that the object of interest's monitor was deflated, so it retries its hash-value-reading operation.

FIG. 12 lists one example of a routine that a thread reading a hash value can use to implement this feature. To read an object's hash value, the illustrated routine, monHash, fetches the lock word from its header, as the sixth line indicates. As the seventh line indicates, it determines from the lock word whether the object has been inflated and, if not, whether the object has yet been assigned a hash value. The eighth through thirteen lines represent a block that the routine executes if the object had not been assigned a hash value.

As the eighth line indicates, monHash first read the lock word, it generates a hash value for the object, as the eighth line indicates. As the ninth line indicates, it then tests whether the object header's lock word has changed it was read in the sixth-line step—i.e., whether any intervening thread has inflated the object's monitor—and, atomically with that test, replaces the lock word with one containing the newly generated lock value if there was no lock-word change. As the ninth and tenth lines indicate, it repeats the steps of reading the object's lock word and testing it for inflation if the ninth-line swap operation fails. Otherwise, it returns the newly generated hash value.

The routine's sixteenth line represents what the routine does in the case in which the object's monitor is not inflated but the object has already been assigned a hash value. In that case, it simply extracts the hash value from the object header's lock word and returns the result.

If the object's monitor is inflated, then the routine has to read the hash value from the monitor record, and do so in a way that will avoid the hazard just outlined. This is the purpose of the blocks that the twentieth through-twenty-fourth lines and the twenty-seventh through thirty-fourth lines represent. The latter block represent the more-general approach, while the former is an optional optimization that some implementations may use for cases in which the object is unlocked even though its monitor is inflated.

To prevent the monitor record from being dissociated from the object that the thread is attempting to read, the twentieth line includes a call to a subroutine monTryLock, which attempts, in a manner similar to that in which FIG. 8's monEnter routine does at its thirtieth line, to obtain a lock by installing the executing thread's identifier in the monitor record's Owner field 62. If it can thus lock the object, it will simply extract the hash code from the monitor's hashCode field and return it. If it cannot thereby lock the object, it does not place its executing thread in the queue of threads waiting to lock the object, as monEnter does.

Instead, it executes the block that the twenty-seventh through thirty-fourth lines represent. This is where the thread uses-the hashReader field as outlined above. Specifically, it installs its executing thread's identifier in that field, as the twenty-seventh and twenty-eighth lines indicate, and then reads the monitor's hashCode field after a memory barrier, as the twenty-ninth and thirtieth lines indicate. It then performs the thirty-first line's steps of rechecks both the monitor's hashReader field and the object header's lock word. If either has changed, it starts the hash-value-reading procedure over again, as the thirty-second line indicates. Otherwise, it performs the thirty-fourth-line step of extracting the hash value from the hashCode field's contents and returning the result.

Of course, the illustrated monitor records' particular format and field set are not critical to the invention, and, to avoid unnecessary complexity, the drawings omit some fields that most embodiments will employ. Moreover, most of the present invention's embodiments will not limit monitor-record use to locking and unlocking. Most will additionally use them for other synchronization operations, such as those performed in response to certain methods of the Java programming language's Object class known as wait, notify, and notifyAll.

The wait, notify, and notifyAll methods provide mechanisms within the Java programming language for inter-thread communication. When a thread calls the wait method on a Java object, the thread's execution is interrupted and, and the thread is not in general placed on the system's ready queue, i.e., the queue of threads that the system will allocate execution time. Instead, it is put on a queue of "waiters" (different from the queue to which FIG. 7A's Blocked field 72 points, i.e., the queue of threads waiting to lock the object). If another thread thereafter-calls the notifyAll method on the same object, all such waiters are transferred from the waiter queue to the ready queue: they are "awakened." If another thread instead calls the notify method, only one waiter thread is awakened.

Most of the present invention's embodiments will include further fields for implementing the waiter queue, but their waiters for notification will use the same reference-count field (in the drawings, rcThis) to inhibit deflation as waiters for locks do. That is, a thread adding itself to the waiter queue will additionally increment the common reference count, and a notifying thread will decrement it by the number of waiters it has awakened.

From the foregoing description, it will be apparent to those skilled in the art that employing the present invention's teachings can provide an inexpensive lock mechanism in a wide range of embodiments. The present invention thus constitutes a significant advance in the art.

What is claimed is:

1. A computer system configured by computer instructions to operate as a compiler/interpreter that:
   A) in response to electrical signals representing source code that calls for an execution thread to lock an object for which there has been allocated an object structure that includes synchronization information that indicates whether the object's monitor has been inflated, and, if so, identifies a monitor record, thereby associated with the object, that includes a reference count and a lock indicator that indicates whether the object is locked, produces electrical signals representing object code that directs a processor to perform a lock operation by:
      i) reading the synchronization information in the object structure;
      ii) if the synchronization information thereby read does not indicate that the object has been inflated, inflating the object's monitor by so changing the synchronization information in the object structure as to make the synchronization information indicate that the object's monitor is inflated and associate with that object a monitor record whose lock indicator indicates that the object is locked; and
      iii) if the synchronization information does indicate that the object's monitor has been inflated and identifies a monitor record whose lock indicator indicates that the object has been locked,
         a) incrementing that monitor's reference count to indicate that the thread is waiting for the object; and
         b) repeatedly rereading the synchronization information, and reading the monitor record's lock indicator if the synchronization indicator still associates the same monitor record with the object, until:
            (1) the synchronization indicator no longer associates the same monitor record with the object, in which case the thread recommences the lock operation, or:
            (2) the lock indicator no longer indicates that the object is locked, in which case the thread locks the object by making the lock indicator indicate that the object is again locked; and
   B) in response to electrical signals representing source code that calls for an execution thread to unlock the object, produces electrical signals representing object code that directs a processor to perform an unlock operation in which the thread:
      i) reads the reference count in the monitor record associated with the object; and
      ii) if the reference count indicates that no other thread is waiting for the object:
         a) changes the object's synchronization information to indicate that the object's monitor is not inflated without confirming atomically with the synchronization-information change that the reference count still indicates that no further thread is waiting for the object;
         b) re-reads the reference count in the monitor record associated with the object; and
         c) if the reference count indicates that another thread is waiting for the object causing that other thread to recommence the lock operation.

2. A computer system as defined in claim 1 wherein the reading of the synchronization information during the lock operation is performed atomically with the changing of the object's synchronization information to inflate the object's monitor when the object's monitor is not inflated.

3. A computer system as defined in claim 2 wherein:
   A) an execution thread is allocated execution time only if it is in a ready queue;
   B) a thread performing the lock operation precedes its rereading of the synchronization information by having its execution interrupted without leaving itself in the ready queue; and
   C) a thread performing the unlock operation places a thread thus interrupted on the ready queue if there is such a thread.

4. A computer system as defined in claim 1 wherein, in performing the operation of locking the object in response to finding that the monitor record's lock indicator no longer indicates that that object is locked after the thread has incremented the monitor record's reference count, the thread decrements the monitor record's reference count.

5. A computer system as defined in claim 4 wherein:
   A) an execution thread is allocated execution time only if it is in a ready queue;

B) a thread performing the lock operation precedes its rereading of the synchronization information by having its execution interrupted without leaving itself in the ready queue; and C) a thread performing the unlock operation places a thread thus interrupted on the ready queue if there is such a thread.

6. A computer system as defined in claim 4 wherein the reading of the synchronization information during the lock operation is performed atomically with the changing of the object's synchronization information to inflate the object's monitor when the object's monitor is not inflated.

7. A computer system as defined in claim 6 wherein:

A) an execution thread is allocated execution time only if it is in a ready queue;

B) a thread performing the lock operation precedes its rereading of the synchronization information by having its execution interrupted without leaving itself in the ready queue; and C) a thread performing the unlock operation places a thread thus interrupted on the ready queue if there is such a thread.

8. A computer system as defined in claim 1 wherein:

A) the monitor record includes a nest-count indicator and an owner identifier; and B) the lock operation includes incrementing the monitor record's nest-count indicator when the object structure's synchronization information indicates that the object's monitor has already been inflated and the monitor record's lock indicator and owner identifier indicate that the object is locked by the thread.

9. A computer system as defined in claim 1 wherein:

A) an execution thread is allocated execution time only if it is in a ready queue;

B) a thread performing the lock operation precedes its rereading of the synchronization information by having its execution interrupted without leaving itself in the ready queue; and C) a thread performing the unlock operation places a thread thus interrupted on the ready queue if there is such a thread.

10. A computer system as defined in claim 1 wherein the owner identifier is the lock indicator and indicates the absence of a lock when it identifies no thread.

11. A computer system as defined in claim 1 wherein, in response to electrical signals representing source code that calls for an execution thread to wait on the object for notification, produces electrical signals representing object code that directs a processor to increment the reference count in a monitor record associated with the object.

12. A method of generating object code comprising:

A) in response to electrical signals representing source code that calls for an execution thread to lock an object for which there has been allocated an object structure that includes synchronization information that indicates whether the object's monitor has been inflated, and, if so, identifies a monitor record, thereby associated with the object, that includes a reference count and a lock indicator that indicates whether the object is locked, producing electrical signals representing object code that directs a processor to perform a lock operation by:

i) reading the synchronization information in the object structure;

ii) if the synchronization information thereby read does not indicate that the object has been inflated, inflating the object's monitor by so changing the synchronization information in the object structure as to make the synchronization information indicate that the object's monitor is inflated and associate with that object a monitor record whose lock indicator indicates that the object is locked; and iii) if the synchronization information does indicate that the object's monitor has been inflated and identifies a monitor record whose lock indicator indicates that the object has been locked, a) incrementing that monitor's reference count to indicate that the thread is waiting for the object; and b) repeatedly rereading the synchronization information, and reading the monitor record's lock indicator if the synchronization indicator still associates the same monitor record with the object, until:

(1) the synchronization indicator no longer associates the same monitor record with the object, in which case the thread recommences the lock operation, or:

(2) the lock indicator no longer indicates that the object is locked, in which case the thread locks the object by making the lock indicator indicate that the object is again locked; and B) in response to electrical signals representing source code that calls for an execution thread to unlock the object, producing electrical signals representing object code that directs a processor to perform an unlock operation in which the thread:

i) reads the reference count in the monitor record associated with the object; and ii) if the reference count indicates that no other thread is waiting for the object:

a) changes the object's synchronization information to indicate that the object's monitor is not inflated without confirming atomically with the synchronization-information change that the reference count still indicates that no further thread is waiting for the object;

b) re-reads the reference count in the monitor record associated with the object; and c) if the reference count indicates that another thread is waiting for the object, causing that other thread to recommence the lock operation.

13. A method as defined in claim 12 wherein the reading of the synchronization information during the lock operation is performed atomically with the changing of the object's synchronization information to inflate the object's monitor when the object's monitor is not inflated.

14. A method as defined in claim 13 wherein:

A) an execution thread is allocated execution time only if it is in a ready queue;

B) a thread performing the lock operation precedes its rereading of the synchronization information by having its execution interrupted without leaving itself in the ready queue; and C) a thread performing the unlock operation places a thread thus interrupted on the ready queue if there is such a thread.

15. A method as defined in claim 12 wherein, in performing the operation of locking the object in response to finding that the monitor record's lock indicator no longer indicates that that object is locked after the thread has incremented the monitor record's reference count, the thread decrements the monitor record's reference count.

16. A method as defined in claim 15 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

17. A method as defined in claim 15 wherein the reading of the synchronization information during the lock operation is performed atomically with the changing of the object's synchronization information to inflate the object's monitor when the object's monitor is not inflated.

18. A method as defined in claim 17 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

19. A method as defined in claim 12 wherein:
A) the monitor record includes a nest-count indicator and an owner identifier; and
B) the lock operation includes incrementing the monitor record's nest-count indicator when the object structure's synchronization information indicates that the object's monitor has already been inflated and the monitor record's lock indicator and owner identifier indicate that the object is locked by the thread.

20. A method as defined in claim 12 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

21. A method as defined in claim 12 wherein the owner identifier is the lock indicator and indicates the absence of a lock when it identifies no thread.

22. A method as defined in claim 12 wherein, in response to electrical signals representing source code that calls for an execution thread to wait on the object for notification, produces electrical signals representing object code that directs a processor to increment the reference count in a monitor record associated with the object.

23. A storage medium containing instructions readable by a computer system to configure the computer system to operate as a compiler/interpreter that:
A) in response to electrical signals representing source code that calls for an execution thread to lock an object for which there has been allocated an object structure that includes synchronization information that indicates whether the object's monitor has been inflated, and, if so, identifies a monitor record, thereby associated with the object, that includes a reference count and a lock indicator that indicates whether the object is locked, produces electrical signals representing object code that directs a processor to perform a lock operation by:
  i) reading the synchronization information in the object structure;
  ii) if the synchronization information thereby read does not indicate that the object has been inflated, inflating the object's monitor by so changing the synchronization information in the object structure as to make the synchronization information indicate that the object's monitor is inflated and associate with that object a monitor record whose lock indicator indicates that the object is locked; and
  iii) if the synchronization information does indicate that the object's monitor has been inflated and identifies a monitor record whose lock indicator indicates that the object has been locked,
    a) incrementing that monitor's reference count to indicate that the thread is waiting for the object; and
    b) repeatedly rereading the synchronization information, and reading the monitor record's lock indicator if the synchronization indicator still associates the same monitor record with the object, until:
      (1) the synchronization indicator no longer associates the same monitor record with the object, in which case the thread recommences the lock operation, or:
      (2) the lock indicator no longer indicates that the object is locked, in which case the thread locks the object by making the lock indicator indicate that the object is again locked; and
B) in response to electrical signals representing source code that calls for an execution thread to unlock the object, produces electrical signals representing object code that directs a processor to perform an unlock operation in which the thread:
  i) reads the reference count in the monitor record associated with the object; and
  ii) if the reference count indicates that no other thread is waiting for the object:
    a) changes the object's synchronization information to indicate that the object's monitor is not inflated without confirming atomically with the synchronization-information change that the reference count still indicates that no further thread is waiting for the object;
    b) re-reads the reference count in the monitor record associated with the object; and
    c) if the reference count indicates that another thread is waiting for the object, causing that other thread to recommence the lock operation.

24. A storage medium as defined in claim 23 wherein the reading of the synchronization information during the lock operation is performed atomically with the changing of the object's synchronization information to inflate the object's monitor when the object's monitor is not inflated.

25. A storage medium as defined in claim 24 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

26. A storage medium as defined in claim 23 wherein, in performing the operation of locking the object in response to finding that the monitor record's lock indicator no longer indicates that that object is locked after the thread has incremented the monitor record's reference count, the thread decrements the monitor record's reference count.

27. A storage medium as defined in claim 26 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

28. A storage medium as defined in claim 26 wherein the reading of the synchronization information during the lock operation is performed atomically with the changing of the object's synchronization information to inflate the object's monitor when the object's monitor is not inflated.

29. A storage medium as defined in claim 28 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

30. A storage medium as defined in claim 23 wherein:
A) the monitor record includes a nest-count indicator and an owner identifier; and
B) the lock operation includes incrementing the monitor record's nest-count indicator when the object structure's synchronization information indicates that the object's monitor has already been inflated and the monitor record's lock indicator and owner identifier indicate that the object is locked by the thread.

31. A storage medium as defined in claim 23 wherein:
A) an execution thread is allocated execution time only if it is in a ready queue;
B) a thread performing the lock operation precedes its rereading of the synchronization information by having its execution interrupted without leaving itself in the ready queue; and
C) a thread performing the unlock operation places a thread thus interrupted on the ready queue if there is such a thread.

32. A storage medium as defined in claim 23 wherein the owner identifier is the lock indicator and indicates the absence of a lock when it identifies no thread.

33. A storage medium as defined in claim 23 wherein, in response to electrical signals representing source code that calls for an execution thread to wait on the object for notification, produces electrical signals representing object code that directs a processor to increment the reference count in a monitor record associated with the object.

34. A computer signal representing a sequence of instructions that, when executed by a computer system, configures the computer system to operate as a compiler/interpreter that:
A) in response to electrical signals representing source code that calls for an execution thread to lock an object for which there has been allocated an object structure that includes synchronization information that indicates whether the object's monitor has been inflated, and, if so, identifies a monitor record, thereby associated with the object, that includes a reference count and a lock indicator that indicates whether the object is locked, produces electrical signals representing object code that directs a processor to perform a lock operation by:
i) reading the synchronization information in the object structure;
ii) if the synchronization information thereby read does not indicate that the object has been inflated, inflating the object's monitor by so changing the synchronization information in the object structure as to make the synchronization information indicate that the object's monitor is inflated and associate with that object a monitor record whose lock indicator indicates that the object is locked; and
iii) if the synchronization information does indicate that the object's monitor has been inflated and identifies a monitor record whose lock indicator indicates that the object has been locked,
a) incrementing that monitor's reference count to indicate that the thread is waiting for the object; and
b) repeatedly rereading the synchronization information, and reading the monitor record's lock indicator if the synchronization indicator still associates the same monitor record with the object, until:
(1) the synchronization indicator no longer associates the same monitor record with the object, in which case the thread recommences the lock operation, or:
(2) the lock indicator no longer indicates that the object is locked, in which case the thread locks the object by making the lock indicator indicate that the object is again locked; and
B) in response to electrical signals representing source code that calls for an execution thread to unlock the object, produces electrical signals representing object code that directs a processor to perform an unlock operation in which the thread:
i) reads the reference count in the monitor record associated with the object; and
ii) if the reference count indicates that no other thread is waiting for the object:
a) changes the object's synchronization information to indicate that the object's monitor is not inflated without confirming atomically with the synchronization-information change that the reference count still indicates that no further thread is waiting for the object;
b) re-reads the reference count in the monitor record associated with the object; and
c) if the reference count indicates that another thread is waiting for the object, causing that other thread to recommence the lock operation.

35. A computer signal as defined in claim 34 wherein the reading of the synchronization information during the lock operation is performed atomically with the changing of the object's synchronization information to inflate the object's monitor when the object's monitor is not inflated.

36. A computer signal as defined in claim 35 wherein:
A) an execution thread is allocated execution time only if it is in a ready queue;
B) a thread performing the lock operation precedes its rereading of the synchronization information by having its execution interrupted without leaving itself in the ready queue; and C) a thread performing the unlock operation places a thread thus interrupted on the ready queue if there is such a thread.

37. A computer signal as defined in claim 34 wherein, in performing the operation of locking the object in response to finding that the monitor record's lock indicator no longer indicates that that object is locked after the thread has incremented the monitor record's reference count, the thread decrements the monitor record's reference count.

38. A computer signal as defined in claim 37 wherein:
    A) an execution thread is allocated execution time only if it is in a ready queue;
    B) a thread performing the lock operation precedes its rereading of the synchronization information by having its execution-interrupted without leaving itself in the ready queue; and
    C) a thread performing the unlock operation places a thread thus interrupted on the ready queue if there is such a thread.

39. A computer signal as defined in claim 37 wherein the reading of the synchronization information during the lock operation is performed atomically with the changing of the object's synchronization information to inflate the object's monitor when the object's monitor is not inflated.

40. A computer signal as defined in claim 39 wherein:
    A) an execution thread is allocated execution time only if it is in a ready queue;
    B) a thread performing the lock operation precedes its rereading of the synchronization information by having its execution interrupted without leaving itself in the ready queue; and
    C) a thread performing the unlock operation places a thread thus interrupted on the ready queue if there is such a thread.

41. A computer signal as defined in claim 34 wherein:
    A) the monitor record includes a nest-count indicator and an owner identifier; and
    B) the lock operation includes incrementing the monitor record's nest-count indicator when the object structure's synchronization information indicates that the object's monitor has already been inflated and the monitor record's lock indicator and owner identifier indicate that the object is locked by the thread.

42. A computer signal as defined in claim 34 wherein:
    A) an execution thread is allocated execution time only if it is in a ready queue;
    B) a thread performing the lock operation precedes its rereading of the synchronization information by having its execution interrupted without leaving itself in the ready queue; and
    C) a thread performing the unlock operation places a thread thus interrupted on the ready queue if there is such a thread.

43. A computer signal as defined in claim 34 wherein the owner identifier is the lock indicator and indicates the absence of a lock when it identifies no thread.

44. A computer signal as defined in claim 34 wherein, in response to electrical signals representing source code that calls for an execution thread to wait on the object for notification, produces electrical signals representing object code that directs a processor to increment the reference count in a monitor record associated with the object.

45. A compiler/interpreter comprising:
    A) means for, in response to electrical signals representing source code that calls for an execution thread to lock an object for which there has been allocated an object structure that includes synchronization information that indicates whether the object's monitor has been inflated, and, if so, identifies a monitor record, thereby associated with the object, that includes a reference count and a lock indicator that indicates whether the object is locked, producing electrical signals representing object code that directs a processor to perform a lock operation by:
        i) reading the synchronization information in the object structure;
        ii) if the synchronization information thereby read does not indicate that the object has been inflated, inflating the object's monitor by so changing the synchronization information in the object structure as to make the synchronization information indicate that the object's monitor is inflated and associate with that object a monitor record whose lock indicator indicates that the object is locked; and
        iii) if the synchronization information does indicate that the object's monitor has been inflated and identifies a monitor record whose lock indicator indicates that the object has been locked,
            a) incrementing that monitor's reference count to indicate that the thread is waiting for the object; and
            b) repeatedly rereading the synchronization information, and reading the monitor record's lock indicator if the synchronization indicator still associates the same monitor record with the object, until:
                (1) the synchronization indicator no longer associates the same monitor record with the object, in which case the thread recommences the lock operation, or:
                (2) the lock indicator no longer indicates that the object is locked, in which case the thread locks the object by making the lock indicator indicate that the object is again locked; and
    B) means for, in response to electrical signals representing source code that calls for an execution thread to unlock the object, producing electrical signals representing object code that directs a processor to perform an unlock operation in which the thread:
        i) reads the reference count in the monitor record associated with the object; and
        ii) if the reference count indicates that no other thread is waiting for the object:
            a) changes the object's synchronization information to indicate that the object's monitor is not inflated without confirming atomically with the synchronization-information change that the reference count still indicates that no further thread is waiting for the object;
            b) re-reads the reference count in the monitor record associated with the object; and
            c) if the reference count indicates that another thread is waiting for the object, causing that other thread to recommence the lock operation.

* * * * *